US008490159B2

(12) United States Patent
Costa et al.

(10) Patent No.: US 8,490,159 B2
(45) Date of Patent: Jul. 16, 2013

(54) METHOD FOR INCREASING SECURITY IN A PASSIVE OPTICAL NETWORK

(75) Inventors: Luciana Costa, Turin (IT); Roberta D'Amico, Turin (IT); Paolo De Lutiis, Turin (IT); Manuel Leone, Turin (IT); Maurizio Valvo, Turin (IT); Paolo Solina, Turin (IT)

(73) Assignee: Telecom Italia S.p.A., Milan (IT)

( * ) Notice: Subject to any disclaimer, the term of this patent is extended or adjusted under 35 U.S.C. 154(b) by 80 days.

(21) Appl. No.: 13/127,404

(22) PCT Filed: Nov. 3, 2008

(86) PCT No.: PCT/EP2008/064885
§ 371 (c)(1),
(2), (4) Date: May 3, 2011

(87) PCT Pub. No.: WO2010/060456
PCT Pub. Date: Jun. 3, 2010

(65) Prior Publication Data
US 2011/0214160 A1   Sep. 1, 2011

(51) Int. Cl.
*G06F 21/00* (2006.01)
(52) U.S. Cl.
USPC .......................................................... 726/3
(58) Field of Classification Search
USPC .......................................................... 726/3
See application file for complete search history.

(56) References Cited

U.S. PATENT DOCUMENTS

| 7,853,801 | B2 | 12/2010 | Kim et al. |
| 8,208,815 | B1 * | 6/2012 | Chiang et al. ................. 398/155 |
| 2006/0129814 | A1 * | 6/2006 | Eun et al. ...................... 713/168 |
| 2007/0274720 | A1 | 11/2007 | Menasco, Jr. et al. |
| 2008/0040604 | A1 | 2/2008 | Kim et al. |

OTHER PUBLICATIONS

Written Opinion and International Search Report dtd Jul. 7, 2009, PCT/EP2008/064885.

(Continued)

*Primary Examiner* — Kambiz Zand
*Assistant Examiner* — Aubrey Wyszynski
(74) *Attorney, Agent, or Firm* — Banner & Witcoff, Ltd.

(57) ABSTRACT

A method for security in a passive optical network is disclosed. The method includes, at an optical line termination (OLT): detecting an optical termination device and establishing a connection with the device; generating a first authentication message including a first random number; and transmitting the first authentication message through the established connection. At the optical termination device, the method may include: receiving the first authentication message; calculating a first authentication code by using the first random number and a secret code stored at the device; and generating and transmitting to the OLT a second authentication message including the first authentication code. The method may further include, at the OLT: receiving the second authentication message; calculating a second authentication code by using the first random number and a secret code stored at the OLT; and authenticating the optical termination device if the first authentication code matches the second authentication code.

16 Claims, 8 Drawing Sheets

OTHER PUBLICATIONS

Sun-Sik Roh et al.: "Security model and authentication protocol in EPON-based optical access network" Transparent Optical Networks, 2003. Proceedings of 2003 5th Internatio Nal Conference on Warsaw, Poland Jun. 29-Jul. 3, 2003, Piscataway, NJ, USA,IEEE, US, vol. 1, Jun. 29, 2003, pp. 99-102, XP010681404 ISBN: 978-0-7803-7816-2.

Menezes et al.: "Handbook of Applied Cryptography, Challenge-Response Identification (Strong Authentication)" Handbook of Applied Cryptography; [CRC Press Series on Discrete Mathematices and Its Applications], CRC Press, Boca Raton, FL, US, Jan. 1, 1997, pp. 397-404,490, XP002282273 ISBN: 978-0-8493-8523-0.

ITU-T Recommendation G.984.3 (Feb. 2004).

Gutierrez et al., "TDM-PON Security Issues: Upstream Encryption is Needed", Conference on Optical Fiber Communication and National Fiber Optic Engineers Conference 2007 (OFC/NFOEC 2007), Mar. 25-29, 2007, Anaheim (CA), pp. 1-3, ISBN 1-55752-831-4.

T. Wu, "The SRP Authentication and Key Exchange System", SRP-SHA1 RFC2945, Stanford University, Sep. 2000 (available at http://www.ietf.org/rfc/rfc2945.txt).

\* cited by examiner

| Request_Password | |
|---|---|
| octect | content |
| 1 | OTD2-id |
| 2 | 00001001 |
| 3 | OLT_A_S |
| 4-12 | C1 |

Figure 5a

| Password | |
|---|---|
| octect | content |
| 1 | OTD2-id |
| 2 | 00000010 |
| 3 | ONT2_A_S |
| 4 | FI |
| 5-12 | fragment of AC* |

Figure 5b

| Encryption_Key | |
|---|---|
| octect | content |
| 1 | ONT2-id |
| 2 | 00000101 |
| 3 | KI |
| 4 | FI |
| 5-12 | fragment of E-AC* or N2 |

Figure 6b

| Request_Key | |
|---|---|
| octect | content |
| 1 | ONT2-id |
| 2 | 00001101 |
| 3 | FI |
| 4-12 | fragment of C-AC or N1 |

Figure 6a

METHOD FOR INCREASING SECURITY IN A PASSIVE OPTICAL NETWORK

CROSS REFERENCE TO RELATED APPLICATIONS

This is a U.S. National Phase Application under 35 U.S.C. §371 of International Application No. PCT/EP2008/064885, filed Nov. 3, 2008, which was published Under PCT Article 21(2), the entire contents of which are incorporated herein by reference.

TECHNICAL FIELD

The present invention generally relates to the field of optical access networks. In particular, the present invention relates to a method for increasing security in a passive optical network. Further, the present invention relates to an optical line termination, an optical termination device and a passive optical network suitable for implementing such a method.

BACKGROUND ART

Internet Protocol (IP) is becoming one of the most widespread protocols for implementing the network layer in a communication network. In particular, Next Generation Networks (briefly, NGNs) are known, i.e. packet-based networks using IP at their network layer. Such NGNs are able to make use of multiple broadband, QoS-enabled transport technologies, while service-related functions are independent of the underlying transport layer technologies. It is expected that NGNs will enable delivery to users of enriched communication services, such as for instance VoIP (Voice Over Internet Protocol), video call, IPTV (Internet Protocol Television) and other multimedia communication services.

A communication network typically comprises a transport backbone and one or more access networks. While, in recent years, the transport backbone has experienced substantial growth, little has changed in the access networks. As a consequence, the "last mile" is still the main bottleneck between high-capacity Local Area Networks (LANs) and the transport backbone.

The most widespread solutions for implementing access networks today are Digital Subscriber Line (briefly, DSL) networks and Cable Modem (briefly, CM) networks. Although these solutions are an improvement compared to 56 Kbps dial-up lines, they are unable to provide enough bandwidth for the above mentioned enriched communication services.

More particularly, neither DSL nor cable modems can keep up with the ever growing bandwidth demand of such enriched communication services, since both technologies are built on top of existing communication infrastructures not optimised for data traffic. Indeed, in CM networks only a few channels are dedicated to transport of data, while the majority of bandwidth is used for transporting analog video signals. As to DSL networks, they do not allow sufficient data rates at required distances, due to signal distortion and crosstalk.

Passive Optical Networks (briefly, PONs) and, in particular, Gigabit Passive Optical Networks (briefly, GPONs) are currently considered among the best candidates for implementing access networks suitable for providing such IP-based enriched communication services. PONs are generally considered as an attractive solution to the "last mile" problem, since a PON minimizes the number of optical transceivers, central office terminations and fiber deployment.

A PON is a point-to-multipoint (P2MP) optical network with no active elements in the signals' path from source to destination. The only elements used in a PON are passive optical components, such as optical fiber, splices and splitters.

More particularly, a PON typically comprises an optical line termination (briefly termed OLT) and an optical distribution network (briefly termed ODN). The ODN comprises a plurality of optical links (typically comprising silica-based single-mode optical fibers) and optical splitters arranged so as to form a point-multipoint structure radiating from the OLT.

The OLT is suitable for interfacing the ODN with the transport backbone, such as for instance a metropolitan area network (briefly, MAN) or a wide area network (briefly, WAN).

On the other hand, the ODN is suitable for allowing the OLT to exchange traffic with users connected at the far end of its optical links at transmission rates which typically can be higher than 100 Mbit/s. This advantageously allows the users to share the usage (and therefore the costs) of the OLT, thus allowing them to access broadband data services and broadband telephone services at acceptable costs.

When a PON is used for FTTB (Fiber To The Building) or FTTC (Fiber To The Curb) applications, each optical link of the ODN is terminated at its far end with a respective Optical Network Unit (briefly, ONU), which may be located either at the basement of a building or at the curb in the proximity of one or more buildings.

On the other hand, when the PON is used for FTTH (Fiber To The Home) applications, each optical link of the ODN is terminated at its far end with a respective optical network termination (briefly termed ONT), which is typically located within the user's home.

In the present description and in the claims, the expression "optical termination device" will designate an optical device suitable for terminating an optical link of an ODN at its far end, i.e. either a ONU (in case of FTTB or FTTC applications) or a ONT (in case of FTTH applications).

Recently, several security threats to a PON used for FTTH applications have been discovered. Most of such security threats relate to Denial of Services (DoS) attacks, and to attacks to confidentiality of traffic transmitted through the PON.

A serious threat to a PON when used for FTTH applications is the possibility for a malicious entity to steal an already provisioned and activated ONT, and then to access the PON without authentication and/or authorization. This is because the ONT typically is not physically protected, since it is managed directly by the user. Moreover, the need to lower the costs for activation and management of a new ONT makes it difficult to adopt robust security mechanisms, such as security mechanisms based on smart cards.

A malicious entity (e.g. a hacker), with a stolen ONT, can cause several security issues to the PON operator, to the service provider and to users.

For example, a hacker can access a PON by connecting the stolen ONT to an unused port of a splitter of the ODN. Alternatively, the hacker may add a splitter to a link of the ODN, and connect the stolen ONT to the added splitter. In this way, the hacker may receive at least part of the traffic directed to another user. In the above cases, the hacker's ONT acts as a legitimate customer's ONT.

Besides, for instance, a hacker can create a fraud ONT and then use the fraud ONT either for intercepting traffic transmitted to other ONTs or for disturbing transmission from the other ONTs to the OLT.

In order to face the above-mentioned security issues related to a PON, a number of solutions have been proposed.

First of all, each time an optical termination device is connected to an optical link of an ODN and is switched on, the optical termination device typically has to be activated at the OLT. In particular, the ITU-T Recommendation G.984.3 (February 2004) discloses that the activation process is performed under the control of the OLT. The process is started by the OLT, which periodically checks for possible activation of new optical termination devices and/or possible reactivation of switched-off optical termination devices. According to the above mentioned ITU-T Recommendation G.984.3, the activation procedure includes three phases: Parameter Learning, Serial Number Acquisition, and Ranging.

During the Parameter Learning phase, the optical termination device, while remaining passive, acquires operating parameters to be used in the upstream transmission.

During the Serial Number Acquisition phase, the OLT discovers possible new optical termination devices by opening a window for upstream transmission (called "ranging window") and asking for serial number transmission. In this ranging window, new optical termination devices send their respective serial numbers to the OLT. Upon reception of each serial number, the OLT associates it with an unused optical termination device identifier and sends it to the corresponding optical termination device.

The ITU-T Recommendation G.984.3 (February 2004), paragraph 10.1.1 discloses two methods for acquiring the serial number of a new optical termination device.

According to a first method ("Method-A"), the serial number of the optical termination device is recorded in a local memory of the OLT by the network provider before the optical termination device is switched on for the first time. Therefore, when the OLT detects the optical termination device, it retrieves from its local memory the serial number of the optical termination device and checks whether this retrieved serial number is one of the already stored ones. In the affirmative, the OLT activates the optical termination device, while in the negative the OLT stops the activation procedure.

On the other hand, according to the second method ("Method B"), the serial number of the optical termination device is automatically retrieved by the OLT when the optical termination device is detected for the first time. In particular, when the OLT detects the optical termination device, it retrieves from it its serial number and checks whether the retrieved serial number is one of the already stored ones. In the affirmative, the OLT recognizes the optical termination device as already activated, while in the negative the OLT determines that the optical termination device should be activated for the first time. In this latter case the OLT stores the retrieved serial number in its local memory and activates the optical termination device.

During the Ranging phase, the OLT measures the optical distance between itself and each optical termination device. The aim of the Ranging phase is assigning a time interval for upstream transmission to each optical termination device, thereby synchronizing upstream transmission of the optical termination devices so that the upstream traffic transmitted by each optical termination device arrives at the OLT without collisions.

The ITU-T Recommendation G.984.3 (February 2004), paragraphs 9.2.1-9.2.2 discloses that, upon completion of the Ranging phase, an optional phase allowing the OLT to authenticate an activated optical termination device may be performed, by using a password shared by the OLT and the optical termination device. According to this optional authentication phase, the OLT transmits a Request_Password message to the optical termination. Upon reception of the Request_Password message, the optical termination device replies with a Password message comprising the password. The OLT, which stores an association between the serial number (provided during the Serial Number Acquisition phase) and the expected password, then checks whether the password received from the optical termination device matches with the expected password. In the affirmative, the OLT allows the optical termination device to access the PON; otherwise, the OLT may deny the access to the optical termination device. In case of FTTH applications, this procedure allows the OLT to check that the ONT is always used by the same user, who knows the password associated to the serial number of his ONT. This helps preventing e.g. that an ONT which has been stolen is fraudulently used by parties other than the user.

The ITU-T Recommendation G.984.3 (February 2004) also discloses at paragraph 12.3 that, upon completion of the Ranging phase, an optional phase allowing the OLT and the optical termination device to exchange an encryption key for encrypting data transmitted from the OLT to the optical termination device (also termed "downlink" or "downstream" transmission) can be performed. According to this optional phase, the OLT transmits to the optical termination device a Key_Request message. Upon reception of the Key_Request message, the optical termination device generates an encryption key and transmits it to the OLT, typically by using a number of Encryption_Key messages comprising respective fragments of the encryption key. The OLT then uses the received encryption key for encrypting the data to be transmitted to the optical termination device. This procedure allows preserving confidentiality of the downlink transmission in case it undergoes eavesdropping by unauthorized parties.

Further, US 2007/0274720 discloses a procedure for activating an ONU. First, an account may be associated with a port ID and a first ID. Next, activation data may be received including a serial number of a device and a received ID. Then, it may be determined that the data was received on a port corresponding to the port ID and that the received ID corresponds to the first ID. Next, in response to determining that the data was received on the port corresponding to the port ID and that the received ID corresponds to the first ID, the device may be activated to receive at least one service associated with the account.

In addition, US 2008/0040604 discloses a system and a method for providing a secured transmission through an authenticated encryption for each ONU in downlink transmission of an OLT in GPON. The GPON system includes an OLT for generating a GTC downlink frame by receiving data from an external service provider and ONUs for receiving the GTC downlink frame from the OLT and processing the received GTC downlink frame. The OLT performs the authenticated encryption for the generated GTC downlink frame according to the ONU by including an authentication generator and the ONU determines whether the GTC downlink frame is allowed to be processed or not by checking the authentication of the received GTC downlink frame through an authentication checker.

SUMMARY OF THE INVENTION

The Applicant has perceived that all the above known solutions for authenticating an optical termination device at an OLT and/or for encrypting downlink transmission rely on the assumption that uplink transmission is intrinsically immune from eavesdropping. This assumption is essentially based on the strongly directional characteristic of the ODN, in particular of the splitters included in the ODN.

Recently, D. Gutierrez et al., "TDM-PON Security Issues: Upstream Encryption is Needed", Conference on Optical Fiber Communication and National Fiber Optic Engineers Conference 2007 (OFC/NFOEC 2007), 25-29 Mar. 2007, Anaheim (CA), pages 1-3, ISBN 1-55752-831-4, has disclosed that optical signals transmitted from an optical termination device to the OLT (i.e. the uplink transmission) may undergo reflections at the OLT, i.e. they may be partially reflected towards the optical termination devices. This implies that also the uplink transmission may be eavesdropped by intercepting such reflections.

Indeed, in all the above solutions, the information allowing the OLT to authenticate the optical termination device and/or to encrypt downlink transmission are transmitted uplink without providing any protection mechanism of these information, such as e.g. coding, encryption, etc.

In particular, according to the above mentioned ITU-T Recommendation G.984.3 (February 2004), paragraph 9.2.2 the Password message is transmitted uplink from the optical termination device to the OLT without any protection mechanism. Similarly, according to the above mentioned ITU-T Recommendation G.984.3 (February 2004), paragraph 12.3 the Encryption_Key messages are transmitted uplink from the optical termination device to the OLT without any protection mechanism. The same considerations also apply to the received ID of US 2007/0274720 and to the encryption key of US 2008/0040604.

Accordingly, vulnerability to eavesdropping of the uplink transmission in a PON disadvantageously impacts not only on confidentiality of the uplink transmission itself, but also on security of the above known solutions for authenticating an optical termination device at an OLT and/or for encrypting downlink transmission.

Indeed, for instance, in case of the above authentication procedure described by the ITU-T Recommendation G.984.3 (02/2004), paragraph 9.2.1-9.2.2, a hacker may intercept reflections of the uplink optical signals carrying the Password message. The hacker would then be able to eavesdrop on the transmission, determine the password and use it for fraudulently authenticating at the OLT.

Similarly, in case of the above procedure for encrypting downlink transmission described by the ITU-T Recommendation G.984.3 (02/2004), paragraph 12.3, a hacker may intercept reflections of the uplink optical signals carrying the Encryption_Key messages. The hacker would then be able to eavesdrop on the transmission, determine the encryption key and use it for decrypting downlink transmission.

Similar considerations also apply to the solutions disclosed by US 2007/0274720 and US 2008/0040604.

Moreover, the Applicant has noticed that the above solutions for authenticating an optical termination device at an OLT and/or for encrypting downlink transmission disadvantageously do not allow to authenticate the OLT at the optical termination device, i.e. they do not allow a user to check whether the PON to which he/she connected his/her optical termination device is a "trusted" PON.

Accordingly, the Applicant has tackled the problem of increasing security in a passive optical network when the passive optical network is accessed by means of an optical termination device.

According to the present invention, security in a passive optical network is increased by eliminating transmission of text passwords and/or encryption keys in cleartext over the optical access network, thus making possible eavesdropping of the traffic transmitted across the ODN (in particular, the uplink traffic) ineffective.

More particularly, according to the present invention, the above mentioned procedures disclosed by the ITU-T Recommendation G.984.3 (February 2004) is extended by providing a strong authentication mechanism between the OLT and the optical termination device. The expression "strong authentication" means an authentication procedure in which the secret code is never exchanged in clear text between the OLT and the optical termination device. Preferably, this mechanism is performed immediately after the ranging phase is concluded. The ranging phase, as mentioned above, corresponds to synchronize the upstream transmission of the optical termination devices linked to an optical line termination. For example, the ranging phase may end with the Equalization Delay transmission by the OLT to the optical termination device. The equalization Delay is based on measuring the Round Trip Delay between the OLT and the optical termination device ranged.

The strong authentication mechanism is preferably based on a secret (i.e. a secret code) that both the OLT and the optical termination device know. The secret is never exchanged in clear text between the OLT and the optical termination device. During a mutual authentication process, the OLT and the optical termination device simply prove each other that they know the secret code, without transmitting the secret code through the passive optical network.

According to preferred embodiments of the present invention, a mechanism for generating an encryption key is further provided, that allows the OLT and the optical termination device (after successful mutual authentication) to independently generate the encryption key, without transmitting the encryption key through the passive optical network in cleartext.

In particular, after the mutual authentication has been successfully completed, the OLT and the optical termination device preferably exchange data which, in combination with the secret code, allow both the OLT and the optical termination device to generate independently the encryption key.

Preferably, the method also provides a secure key updating mechanism for refreshing the encryption key. This is achieved by exchanging authenticated messages which allow the OLT and the optical termination device to independently generate a new encryption key without transmitting it through the passive optical network.

According to this mechanism for updating the encryption key, the OLT and the optical termination device preferably exchange authenticated data which, in combination with the secret code, allow both the OLT and the optical termination device to generate independently a new encryption key.

According to preferred embodiments of the present invention, the above authentication mechanism and the mechanism for generating and updating the encryption key are implemented by exchanging between the OLT and the optical termination device physical layer operation and management messages (PLOAM Preferably said physical layer operation and management messages are exchanged between the OLT and the optical termination device at the layer of the layer model providing the PON management functionalities, such as ranging, activation of optical termination devices, alarm transfer and possibly other functions. This layer may correspond, e.g. to the layer 2 of the OSI seven-layer model, concerning the breakdown of data packets into bits to be sent over the layer 1 and more specifically to the Media Access Control (MAC) sub-layer of layer 2. Layer 2 also comprises a further sub-layer called Radio Link Control. The Media Access Control (MAC) sub-layer controls how a device on the network gains access to the data and permission to transmit it while the Radio Link Control (RLC) sub-layer controls the transmission itself.

Specifically, a PLOAM messages is a dedicated message that can be sent downstream by the OLT to the OTDs and by the OTDs upstream to the OLT conveying operation and management functions between them.

This advantageously allows avoiding the addition of other messages for performing the authentication mechanism and the mechanism for generating and updating the encryption key. This allows the cost of the authentication procedure to be kept very low. This also advantageously allows the authentication procedure to be maintained as defined by the ITU-T Recommendation G.984.3 from the user point of view. This is advantageous, in that the user may still perform the same operations he used to perform during the known authentication procedure, without the need of learning any new authentication procedure. In other words, passing from the known authentication procedure defined by the ITU-T Recommendation G.984.3 to the authentication procedure according to the present invention is completely transparent to the user.

Moreover, performing the strong authentication procedure immediately after the ranging procedure by means of the PLOAM messages (which are the only messages that can be transmitted over the network before authentication is completed), and permitting the transmission of the optical termination device only after the strong authentication procedure is successfully completed advantageously allows to provide a very secure mechanism for accessing the passive optical network. Indeed, since during the strong authentication procedure, the optical termination device is allowed to transmit only the PLOAM messages, while it is allowed to transmit traffic at higher layers only after is has been authenticated by the OLT there are no time periods during which the optical termination device, although not authenticated, can transmit higher layer traffic to the OLT.

According to particularly advantageous embodiments the above authentication mechanism and the mechanism for generating and updating the encryption key are implemented by exchanging between the OLT and the optical termination device messages in the form of the above mentioned Request_ Password, Password, Request_Key and Encryption_Key messages defined by the ITU-T Recommendation G.984.3 (02/2004). According to this particularly advantageous variant, only the bytes which the Recommendation defines as UNSPECIFIED are used for carrying the information useful for carrying out the above mechanisms. This allows a strong authentication procedure to be implemented with minimal modifications to standard messages defined by the ITU-T Recommendation G.984.3.

According to a first aspect, the present invention provides a method for increasing security in a passive optical network including an optical termination device and an optical line termination, wherein the method comprises:
a) at the optical line termination:
   a1) detecting access of the optical termination device to the passive optical network;
   a2) establishing a connection with the optical termination device;
   a3) generating a first authentication message comprising a first random number associated to the optical termination device, the first authentication message being configured as a physical layer operations and maintenance message; and
   a4) transmitting the first authentication message through the established connection;
b) at the optical termination device:
   b1) receiving the first authentication message through the established connection;
   b2) calculating a first authentication code by using the first random number and a secret code stored at the optical termination device; and
   b3) generating and transmitting through the established connection a second authentication message comprising the first authentication code, the second authentication message being configured as a physical layer operations and maintenance message;
c) at the optical line termination:
   c1) receiving the second authentication message;
   c2) calculating a second authentication code by using the first random number and a secret code stored at the optical line termination; and
   c3) authenticating the optical termination device if the first authentication code matches the second authentication code.

Preferably, the network includes a plurality of optical termination devices connected to the optical line termination and, step a2) includes assigning a time interval for upstream transmission to the optical termination device; and synchronizing the upstream transmission of the optical termination devices of the plurality.

Preferably, step a3) comprises, at the optical line termination:
   d1) setting a first information indicative of at least one authentication code generation algorithm and/or at least one encryption key generation algorithm and/or at least one encryption key length supported by the optical line termination; and
   d2) transmitting the first information in the first authentication message.

Profitably, step b2) comprises, at the optical termination device:
   e1) generating a second random number;
   e2) setting a second information indicative of an authentication code generation algorithm and/or an encryption key generation algorithm and/or an encryption key length supported by the optical termination device; and
   e3) calculating the first authentication code by using the second random number, the first information and the second information.

Preferably:
step b3) comprises, at the optical termination device:
   f1) transmitting the second random number and the second information in the second authentication message; and
step c2) comprises, at the optical line termination:
   g1) retrieving the second random number and the second information from the second authentication message; and
   g2) using the second random number, the first information and the second information for calculating the second authentication code.

Preferably, the method further comprises:
h) at the optical line termination:
   h1) generating a third random number;
   h2) calculating a first counter-authentication code by using the third random number and the secret code stored at the optical line termination; and
   h3) generating and transmitting through the established connection a third authentication message comprising the third random number and the counter-authentication code, the third authentication message being configured as a physical layer operations and maintenance message;

i) at the optical termination device:
   i1) receiving the third authentication message;
   i2) calculating a second counter-authentication code by using the third random number and the secret code stored at the optical termination device; and
   i3) counter-authenticating the optical line termination if the first counter-authentication code matches the second counter-authentication code.

Profitably, step h2) comprises:
l1) calculating a first authentication key by using the first random number, the second random number and the secret code stored at the optical termination line; and
l2) calculating the first counter-authentication code by using the third random number and the first authentication key.

Preferably, step i2) comprises:
m1) calculating a second authentication key by using the first random number, the second random number and the secret code stored at the optical termination device; and
m2) calculating the second counter-authentication code by using the third random number and the second authentication key.

Profitably, the method further comprises:
n) at the optical termination device:
   n1) generating a fourth random number;
   n2) calculating a first encryption key by using the third random number, the fourth random number and the secret code stored at the optical termination device;
   n3) calculating a first encryption-authentication code by using the third random number, the fourth random number and the encryption key;
   n4) generating a first encryption key message comprising the fourth random number and the first encryption-authentication code, the first encryption key message being configured as a physical layer operations and maintenance message; and
   n5) transmitting the first encryption key message through the established connection;
k) at the optical line termination:
   k1) receiving the first encryption key message;
   k2) calculating a second encryption key by using the third random number, the fourth random number and the secret code stored at the optical termination device;
   k3) generating a second encryption-authentication code by using the third random number, the fourth random number and the second encryption key;
   k4) determining if the first encryption-authentication code matches the second encryption-authentication code thus determining if the first encryption key has the same value of the second encryption key; and in the affirmative
   k5) using the encryption key for encrypting the established connection.

Preferably, step n2) comprises calculating the first encryption key by using the first information and the second information; and step n3) comprises calculating the first encryption-authentication code by using the first information, the second information and the second authentication key.

Profitably, step k2) comprises calculating the second encryption key by using the first information and the second information; and step k3) comprises calculating the second encryption-authentication code by using the first information, the second information and the authentication key.

Preferably, the method further comprises periodically repeating steps h to k, thus refreshing the first and second encryption keys using, at the optical line termination, the second encryption key, and using, at the optical termination device, the first encryption key.

According to a second aspect, the present invention provides an optical line termination for a passive optical network, the optical line termination being suitable for:
   detecting access of an optical termination device to the passive optical network;
   establishing a connection with the optical termination device by assigning a time interval for upstream transmission to the optical termination device;
   generating a first authentication message comprising a first random number associated to the optical termination device, the first authentication message being configured as a physical layer operations and maintenance message;
   transmitting the first authentication message through the established connection;
   receiving a second authentication message through the established connection, the second authentication message comprising a first authentication code, the second authentication message being configured as a physical layer operations and maintenance message;
   calculating a second authentication code by using the first random number and a secret code stored at the optical line termination; and
   authenticating the optical termination device if the first authentication code matches the second authentication code.

According to a third aspect, the present invention provides an optical termination device suitable for accessing a passive optical network, the passive optical network comprising an optical line termination, the optical termination device being suitable for:
   having assigned a time interval for upstream transmission with the optical line termination;
   receiving a first authentication message through an established connection, the first authentication message comprising a first random number associated to the optical termination device, the first authentication message being configured as a physical layer operations and maintenance message;
   calculating an authentication code by using the first random number and a secret code stored at the optical termination device; and
   generating and transmitting through the established connection a second authentication message comprising the first authentication code, the second authentication message being configured as a physical layer operations and maintenance message.

According to a fourth aspect, the present invention provides a passive optical network comprising an optical line termination and an optical termination device as set forth above.

According to a fifth aspect, the present invention provides a computer program comprising computer program code means adapted to perform the following steps, when the program is run on an optical line termination for a passive optical network:
   detecting access of an optical termination device to the passive optical network;
   establishing a connection with the optical termination device by assigning a time interval for upstream transmission to the optical termination device;

generating a first authentication message comprising a first random number associated to the optical termination device, the first authentication message being configured as a physical layer operations and maintenance message;

transmitting the first authentication message through the established connection;

receiving a second authentication message through the established connection, the second authentication message comprising a first authentication code, the second authentication message being configured as a physical layer operations and maintenance message;

calculating a second authentication code by using the first random number and a secret code stored at the optical line termination; and authenticating the optical termination device if the first authentication code matches the second authentication code.

According to a sixth aspect, the present invention provides a computer program comprising computer program code means adapted to perform the following steps, when the program is run on an optical termination device suitable for accessing a passive optical network, the passive optical network comprising an optical line termination:

having assigned a time interval for upstream transmission with the optical line termination;

receiving a first authentication message through an established connection, the first authentication message comprising a first random number associated to the optical termination device, the first authentication message being configured as a physical layer operations and maintenance message;

calculating an authentication code by using the first random number and a secret code stored at the optical termination device; and generating and transmitting through the established connection a second authentication message comprising the first authentication code, the second authentication message being configured as a physical layer operations and maintenance message.

BRIEF DESCRIPTION OF THE DRAWINGS

The present invention will become clearer from the following detailed description, given by way of example and not of limitation, to be read with reference to the accompanying drawings, wherein:

FIGS. 5a and 5b show the structure of a first authentication message and a second authentication message, respectively; and FIGS. 6a and 6b show the structure of a counter-authentication message and an encryption-authentication message, respectively.

DETAILED DESCRIPTION OF PREFERRED EMBODIMENTS OF THE INVENTION

Figure 1:
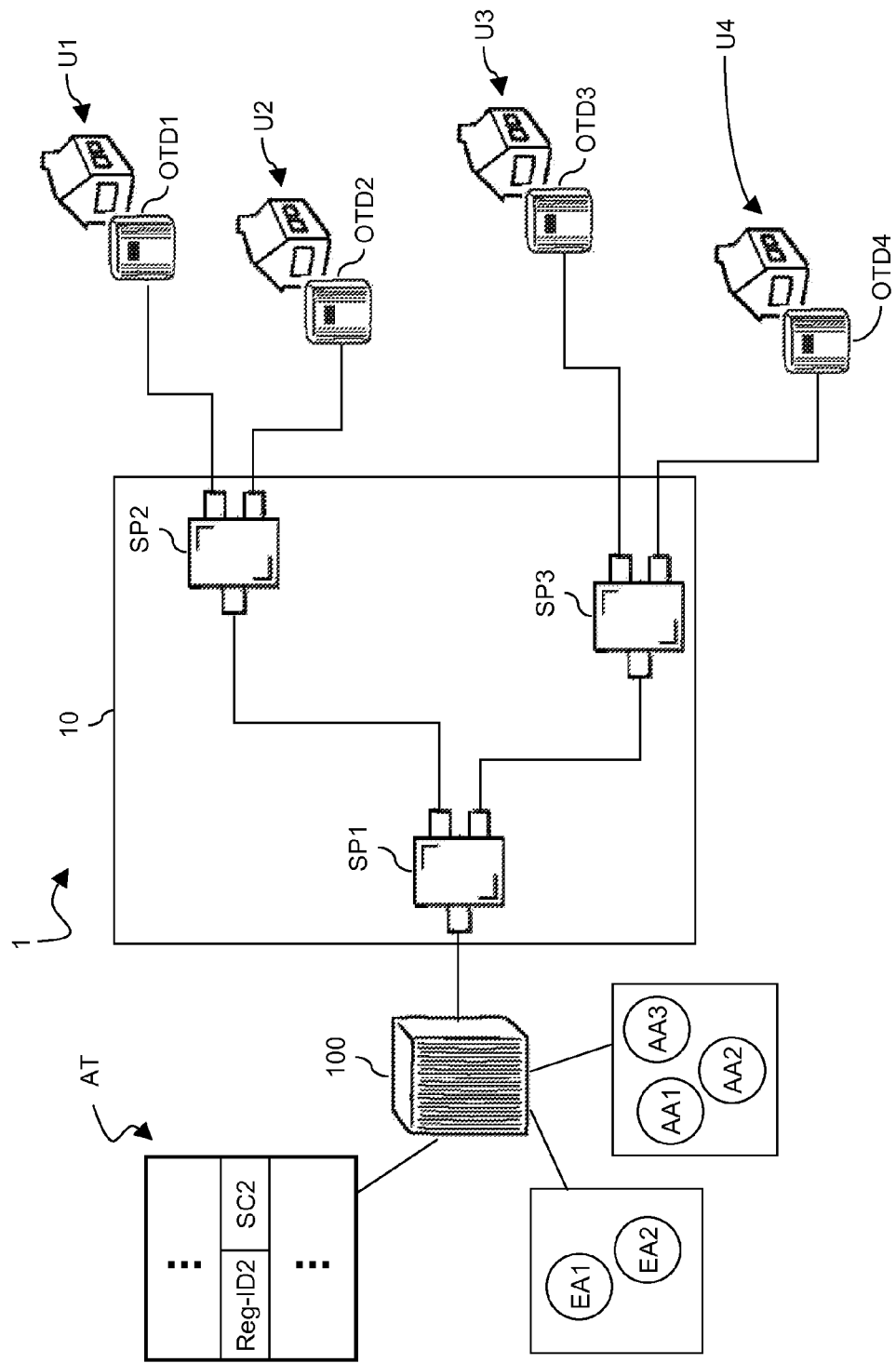
FIG. 1 schematically shows a PON for FTTH applications.

FIG. 1 schematically shows a PON 1 that, in the exemplary embodiment herein after described, is suitable for FTTH applications. However, the PON 1 may be used for other applications, such as for instance the above mentioned FTTB and FTTC applications. The PON 1 preferably comprises an ODN 10 and an OLT 100.

Preferably, the ODN 10 comprises three optical splitters SP1, SP2 and SP3. The optical splitter SP1 has an input optical link connected to the OLT 100 and two output optical links. The optical splitter SP2 has an input optical link connected to one of the output optical links of the optical splitter SP1 and two output optical links. Similarly, the optical splitter SP3 has an input optical link connected to the other output optical link of the optical splitter SP1 and two output optical links.

The ODN 10 shown in FIG. 1 is merely exemplary. Indeed, as mentioned above, an ODN typically comprises optical links and optical splitters arranged so as to form a point-multipoint structure radiating from the OLT 100.

Preferably, each output optical link of the optical splitters SP2 and SP3 may be terminated by a respective optical termination device OTD1, OTD2, OTD3 and OTD4. Since it has been assumed that the PON 1 is suitable for FTTH applications, each optical termination device OTD1, OTD2, OTD3 and OTD4 is an optical termination device which may be located within a respective user's home U1, U2, U3 and U4.

Preferably, the OLT 100 is suitable for cooperating with an association table AT. Preferably, the association table AT comprises, for each optical termination device that will be managed by the OLT 100, a row comprising a registration identifier of the optical termination device and a secret code associated to the registration identifier.

The registration identifier preferably identifies the user (in case the optical termination device is an ONT) or the optical termination device itself (in case the optical termination device is an ONU). Preferably, the registration identifier is transmitted from the optical termination device to the OLT 100 during the authentication procedure that will be described in detail hereinafter, and then is used by the OLT for recognizing the user (or the ONU), and retrieving the associated secret code. Besides, the OLT uses the registration identifier for retrieving the serial number of the optical termination device. This advantageously allows the OLT to associate a given user (i.e. a given registration identifier) to a given optical termination device without configuring in advance such an association at the OLT.

For simplicity, in the association table AT of FIG. 1, only a registration identifier Reg-ID2 of the optical termination device OTD2 and its associated secret code SC2 are depicted. The registration identifier Reg-ID2 and the secret code SC2 can be provided at the OLT 100 by the network provider before the optical termination device OTD2 is switched on for the first time. Alternatively, they can be communicated by the user (in the case of ONT) or by the installation/repair personnel (in the case of ONU termination).

The association table AT may be stored in a local database of the OLT 100, or it may be stored in a centralized database located e.g. at the central office of the PON 1, which centralized database may be accessed by the OLT 100. The role of the association table AT will be described in detail herein after.

Preferably, the OLT 100 is suitable for executing at least one authentication code generation algorithm. By way of example, the OLT 100 is suitable for executing three different authentication code generation algorithms AA1, AA2, AA3. Preferably, each authentication code generation algorithm AA1, AA2, AA3 is a Hash Message Authentication Code (HMAC) function or a keyed-Hash Message Authentication Code (KHMAC) function, i.e. a hash function which does not allow to trace its input value starting from its output value, used in combination with a secret key. Examples of such one-way hash functions are the MD5 (Message-Digest algorithm 5) hash function or the SHA-1 (Secure Hash Algorithm) hash function. The role of the authentication code generation algorithms AA1, AA2, AA3 will be described in detail herein after.

Besides, preferably, the OLT 100 is suitable for executing at least one encryption key generation algorithm. By way of example, the OLT 100 is suitable for executing two different encryption key generation algorithms EA1, EA2. Preferably, each encryption key generation algorithm EA1, EA2 is a hash function such as for instance an MD5 hash function, an SHA hash function or the like, used in combination with a secret key, like HMAC function. The role of the encryption key generation algorithms EA1, EA2 will be described in detail herein after.

By referring to FIG. 2, the method for authenticating at least one of the optical termination devices OTD1, OTD2, OTD3 and OTD4 connected to the PON 1 according to an embodiment of the present invention will be described in detail. In particular, the method will be described by referring to the optical termination device OTD2, which is located within the user's home U2.

Figure 2:
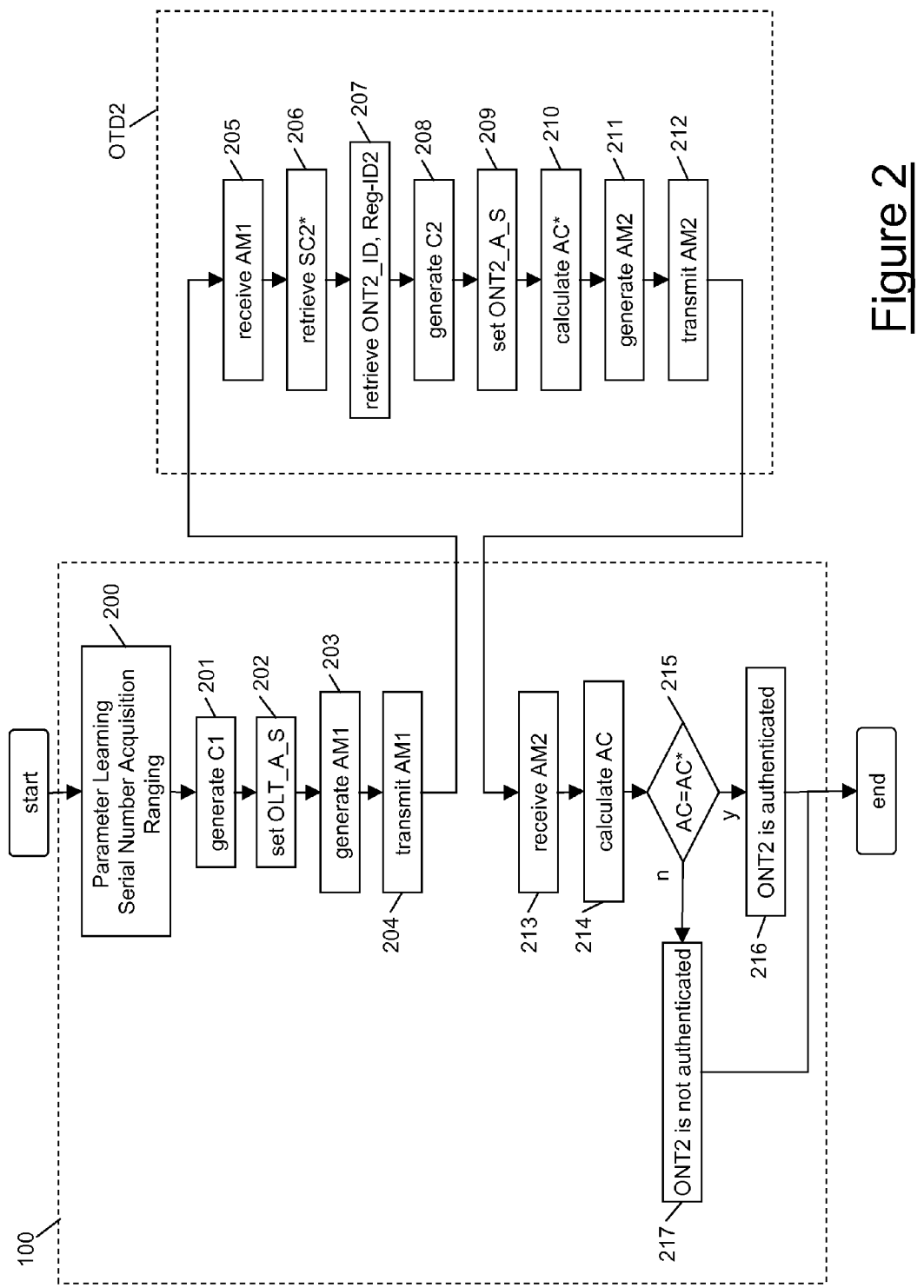
FIG. 2 is a flow chart of a procedure for authenticating at the OLT one of the optical termination devices of the PON shown in FIG. 1.

In the flow chart of FIG. 2, steps 200 to 204 and 213 to 217 are performed by the OLT 100, while steps 205 to 212 are performed by the optical termination device OTD2.

Specifically, when the optical termination device OTD2 is connected to the ODN 10 and is switched on, firstly it undergoes an activation procedure started by the OLT 100 (step 200). Preferably, the above mentioned activation procedure is performed according to that described by the ITU-T Recommendation G.984.3 (February 2004), paragraph 10.1.1 and comprises the above described Parameter Learning, Serial Number Acquisition and Ranging phases.

According to the embodiments of the present invention, upon completion of step 200, the OLT 100 has assigned a device identifier OTD2-ID to the optical termination OTD2, and has communicated such a device identifier OTD2-ID to the optical termination device OTD2. The device identifier OTD2-ID is associated to the serial number of the optical termination device OTD2. Specifically, for assigning a device identifier OTD2-id to the optical termination device OTD2, the OLT 100 looks for a free (not yet allocated) device identifier. In all the procedures hereinafter described the OLT 100 uses the device identifier OTD2-ID instead of the serial number to address the specific optical termination device OTD2. In this way it is avoided the transmission of the serial number during the authentication procedure. In fact the serial number is a sensitive information since it permits to univocally identify the optical termination device associated to it. The OLT 100 then preferably keeps the association between the device identifier OTD2-ID and the serial number of the optical termination device OTD2 in its allocation record.

Preferably, the association between the device identifier OTD2-ID and serial number may change each time the optical termination device OTD2 is authenticated at the OLT 100. As it will be disclosed in detail herein after, if the optical termination device ONT2 is not successfully authenticated by the OLT 100, the association between the device identifier OTD2-ID and serial number of the optical termination device OTD2 is preferably removed from the allocation record, and the device identifier OTD2-ID is free and can be therefore associated to the serial number of another optical termination device.

Then, the OLT 100 generates a first number C1 (step 201). The first number C1 is preferably an integer number which is generated by a random number generation algorithm executed at the OLT 100. Preferably, during step 201, the OLT 100 stores the first number C1 in a local memory and associates to it the device identifier OTD2-ID.

Then, the OLT 100 preferably sets an information OLT_A_S indicative of the authentication code generation algorithms AA1, AA2, AA3 and the encryption key generation algorithms EA1, EA2 supported by the OLT 100 (step 202).

Then, preferably, the OLT 100 generates a first authentication message AM1 (step 203).

Preferably, the first authentication message AM1 is a PLOAM (Physical Layer Operations And Maintenance) message. Preferably, said physical layer operation and management messages are exchanged between the OLT and the optical termination device at the layer of the layer model providing the PON management functionalities, such as ranging, activation of optical termination devices, alarm transfer and possibly other functions. This layer may correspond, e.g., to layer 2 of the OSI seven-layer model, concerning the breakdown of data packets into bits to be sent over layer 1 and more specifically to the Media Access Control (MAC) sub-layer of layer 2. Layer 2 also comprises a further sub-layer called Radio Link Control. The Media Access Control (MAC) sub-layer controls how a device on the network gains access to the data and permission to transmit it while the Radio Link Control (RLC) sub-layer controls the transmission itself. Specifically, a PLOAM messages is a dedicated message that can be sent downstream by the OLT to the OTDs and by the OTDs upstream to the OLT conveying operation and management functions between them. More preferably, the first authentication message AM1 is formatted similarly to a Request_Password message as defined by the ITU-T Recommendation G.984.3 (February 2004), paragraph 9.2.3.9. In particular, the ITU-T Recommendation G.984.3 (February 2004), paragraph 9.2.3.9 discloses that the Request_Password message has twelve octets: the octet 1 includes the device identifier OTD2-ID identifying the optical termination device to which the Request_Password message is addressed, the octet 2 includes the message type ("00001001" indicates a Request_Password message), while the other ten octets are not specified.

The structure of the first authentication message AM1 according to embodiments of the present invention is shown in FIG. 5a.

As shown in FIG. 5a, the octets 1 and 2 of the first authentication message AM1 are compliant with the ITU-T Recommendation G.984.3 (February 2004), paragraph 9.2.3.9, i.e. they comprise the device identifier of the optical termination device to which the Request_Password message is addressed (i.e. OTD2-ID) and the message type "00001001", respectively.

In addition, preferably, the octet 3 comprises the information OLT_A_S, which includes a "KLENCAUT" ("Key Length, ENcryption, AUThentication") content. Specifically, starting from the less significant bit of the octet 3, the bits from 1 to 3 are indicative of the authentication code generation algorithms AA1, AA2, AA3 supported by the OLT 100 for the authentication code generation. The bits from 4 to 6 are indicative of the encryption key generation algorithms EA1, EA2 supported by the OLT 100 for the encryption key generation. The bits from 7 to 8, preferably, are indicative of the key length supported by the OLT 100 for the encryption key to be generated.

Preferably, when bits 1 to 3 are set to a value "001", they indicate that the OLT 100 supports only the SHA-1 (160 bits) function for the authentication code generation. Preferably, when bits 1 to 3 are set to a value "010", they indicate that the OLT 100 supports only the SHA-256 (256 bits) function for the authentication code generation. Preferably, when bits 1 to 3 are set to a value "100", they indicate that the OLT 100 supports only the SHA-512 (512 bits) function for the authentication code generation. The remaining possible values of bits 1 to 3 may be used to define any possible combination of SHA functions. For example, when bits 1 to 3 are set to a value "101", they indicate that the OLT 100 supports both the SHA-1 (160 bits) and the SHA-512 (512 bits) functions for the authentication code generation. Preferably, when bits 1 to 3 are set to a value "110", they indicate that the OLT 100 supports the SHA-256 (256 bits) and the SHA-512 (512 bits) functions for the authentication code generation. Preferably, when bits 1 to 3 are set to a value "011", they indicate that the OLT 100 supports the SHA-1 (160 bits) and the SHA-256 (256 bits) functions for the authentication code generation. Preferably, when bits 1 to 3 are set to a value "111", they indicate that the OLT 100 supports all the SHA functions, i.e. the SHA-1 (160 bits), the SHA-256 (256 bits) and the SHA-512(512 bits), for the authentication code generation.

According to preferred embodiments, when bits 4 to 6 of octet 3 are set to a value "001", they indicate that the OLT 100 supports only the SHA-1 (160 bits) function for the encryption key generation. Preferably, when bits 4 to 6 are set to a value "010", they indicate that the OLT 100 supports only the SHA-256 (256 bits) function for the encryption key generation. Preferably, when bits 4 to 6 are set to a value "100", they indicate that the OLT 100 supports only the SHA-512 (512 bits) function for the encryption key generation. The remaining possible values of bits 4 to 6 may be used to define any possible combinations of SHA functions. For example, when bits 4 to 6 are set to a value "101", they indicate that the OLT 100 supports both the SHA-1 (160 bits) and the SHA-512 (512 bits) functions for the encryption key generation. Preferably, when bits 4 to 6 are set to a value "110", they indicate that the OLT 100 supports the SHA-256 (256 bits) and the SHA-512 (512 bits) functions for the encryption key generation. Preferably, when bits 4 to 6 are set to a value "011", they indicate that the OLT 100 supports the SHA-1 (160 bits) and the SHA-256 (256 bits) functions for the encryption key generation. Preferably, when bits 4 to 6 are set to a value "111", they indicate that the OLT 100 supports all the SHA functions, respectively the SHA-1 (160 bits), the SHA-256 (256 bits) and the SHA-512 (512 bits), for the encryption key generation.

Preferably, when bits 7 and 8 of the octet 3 are set to a value "00", they indicate that the OLT 100 supports a key length of 128 bits. Preferably, when bits 7 and 8 are set to a value "01", they indicate that the OLT 100 supports a key length of 192 bits. Preferably, when bits 7 and 8 are set to a value "10", they indicate that the OLT 100 supports a key length of 256 bits. Preferably, when bits 7 and 8 are set to a value "11", they indicate that the OLT 100 supports any of the preceding key lengths, i.e. 128 bits, 192 bits and 256 bits.

Therefore, for instance, an information OLT_A_S equal to "00001001" may indicate that the OLT 100 supports the SHA-1 hash function both as authentication code generation algorithm and as encryption key generation algorithm, while the key length supported for the encryption key is 128 bits. Besides, for instance, an information OLT_A_S equal to "00010001" may indicate that the OLT 100 supports the SHA-1 hash function as authentication code generation algorithm and the SHA-256 hash function as encryption key generation algorithm, while the key length supported for the encryption key is 128 bits. Besides, for instance, an information OLT_A_S equal to "00110001" may indicate that the OLT 100 supports the SHA-1 hash function as authentication code generation algorithm and the SHA-256 and SHA-512 hash functions as encryption key generation algorithms, while the key length supported for the encryption key is 128 bits. Besides, for instance, an information OLT_A_S equal to "11111111" may indicate that the OLT 100 supports all possible authentication code generation algorithms and all possible encryption key generation algorithms, as well as all possible key lengths.

In addition, preferably, the remaining nine octets 4-12 of the Request_Password message are used for transporting the first number C1. Preferably, it is assumed that the first number C1, expressed in binary coding, has a maximum length equal to or lower than nine octets, namely 64 bits (8 octets). This advantageously allows using a single Request_Password message for transmitting the first number C1, thus avoiding fragmentation of the first number C1 in different Request_Password messages.

By referring again to FIG. 2, preferably, the OLT 100 transmits the first authentication message AM1 to the optical termination device OTD2 by means of the ODN 10 (step 204).

Preferably, the behaviour of an optical termination device may be described in terms of "states", each state indicating a particular condition in which the optical termination device may be during its operation. Exemplary states are switching-on state and ranging state. The ITU-T Recommendation G.984.3, paragraph 10.2.2.2 shows a state diagram of an OTD. According to embodiments of the present invention, an authentication state is added to the states shown in the above Recommendation. Preferably, the optical termination device enters the authentication state after completion of the ranging phase, when it receives the first authentication message AM1 from the OLT 100. Further, preferably, the optical termination device exits the authentication status when the authentication procedure is concluded (either successfully or unsuccessfully).

According to embodiments of the present invention, when the optical termination device OTD2 enters its authentication state upon reception of the first authentication message AM1 (step 205), it firstly checks whether its registers active_key_register and shadow_key_register already comprise an encryption key generated during a previous encryption key generation procedure.

As disclosed by the ITU-T Recommendation G.984.3, paragraph 12.3, the active_key_register is a memory area located both at the OLT and at the optical termination device, which is configured for storing the currently used encryption key. As it will be described in further detail herein after, the OLT may periodically requests the optical termination device to calculate a new encryption key. The shadow_key_register is a memory area located both at the OLT and at the optical termination device, which is configured for temporary storing the newly calculated encryption key. When the OLT decides to start using the newly calculated encryption key for encrypting traffic to be transmitted to the optical termination device, the value of the active_key_register is overwritten with the newly calculated encryption key.

By referring again to FIG. 2, if the optical termination device OTD2 determines that its registers active_key_register and shadow_key_register already comprise an encryption key, it removes the value of such an encryption key from these registers. This procedure is expected to be executed by the OTD2 either when it is switched on or at any time it should be authenticated, such as for example in the case of Loss of Optical Signal.

Then, the optical termination device OTD2 preferably retrieves from a local memory a further secret code SC2* (corresponding to the secret code SC stored at the OLT 100) that, as it will be described in detail herein after, will be used as a secret key for the authentication code generation algorithm (step 206). For inserting the further secret code SC2* into the optical termination device OTD2, said device OTD2 may be provided for example with user input/output modules connected to it. These user input/output modules are configured to present the user with a request of inserting the further secret code SC2* and to allow the user to input such a further secret code SC2*. Preferably, the same user input/output modules can also be used for inserting the registration identifier Reg-ID2 into the device OTD2.

Further, during a step 207, the optical termination device OTD2 retrieves its registration identifier Reg-ID2 and the assigned device identifier ONT2-ID (which it has received from the OLT 100 during the ranging phase).

Then preferably, the optical termination device ONT2 generates a second number C2 (step 208) which is preferably an integer number generated by a random number generation algorithm executed at the OTD2.

In a step 209, the optical termination device OTD2 then preferably sets a further information OTD2_A_S. Preferably, said further information OTD2_A_S includes an indication of a specific authentication code generation algorithm AAi (i=1, 2 or 3) selected by the optical termination device OTD2 among the authentication code generation algorithms AA1, AA2, AA3 supported by the OLT 100 and indicated in the first authentication message AM1. Besides, the further information OTD2_A_S preferably includes an indication of a specific encryption key generation algorithm EAj (j=1 or 2) and an indication of a specific key length. The specific encryption key generation algorithm and the specific key length are selected by the optical termination device OTD2 among the encryption key generation algorithms EA1, EA2 and the key lengths, respectively, supported by the OLT 100 and indicated in the first authentication message AM1.

Then preferably, the optical termination device OTD2 calculates an authentication code AC* (step 210) by applying the selected authentication code generation algorithm AAi to the first number C1 and at least one of: the second number C2, the information OLT_A_S, the further information OTD2_A_S, the device identifier OTD2-ID and the registration identifier Reg-ID2 using the retrieved further secret code as a key for the selected SC* as a key for the selected authentication code generation algorithm AAi. More preferably, the selected authentication code generation algorithm AAi is applied to the first number C1, the second number C2, the information OLT_A_S, the further information OTD2_A_S, the device identifier OTD2-ID and the registration identifier Reg-ID2. Preferably, the retrieved further secret code SC2* is used as a key for the selected authentication code generation algorithm AAi.

Then, preferably, the optical termination device OTD2 generates a second authentication message AM2 (step 211).

Preferably, also said second authentication message AM2 is a PLOAM message. More preferably, said second authentication message AM2 is formatted similarly to a Password message as defined by the ITU-T Recommendation G.984.3 (February 2004), paragraph 9.2.4.2. In particular, the ITU-T Recommendation G.984.3 (February 2004), paragraph 9.2.4.2 discloses that the Password message has twelve octets: the octet 1 includes the identifier of the optical termination device which generated the Password message, the octet 2 includes the message type ("00000010" indicates a Password message), while the other ten octets are used for transporting the password.

The structure of the second authentication message AM2 implemented as a Password message according to embodiments of the present invention is shown in FIG. 5*b*.

As shown in FIG. 5*b*, the octets 1 and 2 of the second authentication message AM2 are compliant with the ITU-T Recommendation G.984.3 (February 2004), paragraph 9.2.4.2, i.e. they comprise the device identifier of the optical termination device from which the Password message is transmitted (i.e. the device identifier OTD2-ID) and the message type "00000010", respectively. In addition, preferably, the remaining ten octets are not compliant with the ITU-T Recommendation G.984.3 (February 2004), paragraph 9.2.4.2. This advantageously allows increasing the security of the second authentication message AM2. Indeed, instead of using the remaining ten octets to transmit the secret code in clear text to the OLT 100, the remaining ten octets are used to convey the information needed to the OLT 100 for authenticating the optical termination device OTD2, while keeping the password (i.e. the secret code) secret.

In particular, preferably, the octet 3 of the Password message comprises the further information OTD2_A_S indicative of the authentication code generation algorithm AAi, the encryption key generation algorithm EAj and the key length selected by the optical termination device OTD2 during step 209.

In particular, the octet 3 comprises the above mentioned KLENCAUT ("Key Length, ENcryption, AUThentication") content. Specifically, starting from the less significant bit, bits 1 to 3 are preferably indicative of the message authentication code generation AAi selected by the optical termination device OTD2. Preferably, bits 4 to 6 are indicative of the encryption key generation EAj selected by the optical termination device OTD2. Preferably, bits 7 and 8 are indicative of the key length selected by the optical termination device OTD2.

Preferably, when bits 1 to 3 are set to a value "001", they indicate that a SHA-1 (160 bits) function has been selected by the optical termination device OTD2 for the authentication code generation. In this case, the entire hash (all the 160 bits) is transmitted. Preferably, when bits 1 to 3 are set to a value "010", they indicate that a SHA-256 (256 bits) function has been selected by the optical termination device OTD2 for the authentication code generation. Also in this case, the entire hash (all the 256 bits) is transmitted. Preferably, when bits 1 to 3 are set to a value "100", they indicate that a SHA-512 (512 bits) function has been selected by the optical termination device OTD2 for the authentication code generation. Also in this case, the entire hash (all the 512 bits) is transmitted. Preferably, when bits 1 to 3 are set to a value "101", they indicate that a SHA-1 (160 bits) function has been selected by the optical termination device OTD2 for the authentication code generation. In this case, only 128 bits of the computed hash are transmitted, said 128 bits being derived by truncating the 32 most significant bits of the 160-bit output. Preferably, when bits 1 to 3 are set to a value "110", they indicate that a SHA-256 (256 bits) function has been selected by the optical termination device OTD2 for the authentication code generation. In this case, only 128 bits of the computed hash are transmitted, said 128 bits being derived by truncating the 128 most significant bits of the 256-bit output. Preferably, when bits 1 to 3 are set to a value "111", they indicate that a SHA-512 (512 bits) function has been selected by the optical termination device OTD2 for the authentication code generation. In this case, only 128 bits of the computed hash are transmitted, said 128 bits being derived by truncating the 384 most significant bits of the 512-bit output.

Preferably, when bits 4 to 6 are set to a value "001", they indicate that a SHA-1 (160 bits) function for the encryption key generation has been selected by the optical termination device OTD2. Preferably, when bits 4 to 6 are set to a value "010", they indicate that a SHA-256 (256 bits) function for the encryption key generation has been selected by the optical termination device OTD2. Preferably, when bits 4 to 6 are set to a value "100", they indicate that a SHA-512 (512 bits) function for the encryption key generation has been selected by the optical termination device OTD2. According to the present invention, the remaining possible values of bits 4 to 6 are not used.

Preferably, when bits 7 and 8 are set to a value "00", they indicate that the optical termination device OTD2 is able to generate an encryption key with a length of 128 bits. Preferably, when bits 7 and 8 are set to a value "01", they indicate that the optical termination device OTD2 is able to generate an encryption key with a length of 192 bits. Preferably, when bits 7 and 8 are set to a value "10", they indicate that the optical termination device OTD2 is able to generate an encryption key with a length of 256 bits. According to embodiments of the present invention, the value "11" of the bits from 7 to 8 is not used.

For instance, a further information OTD2_A_S equal to "00001001" may indicate that the optical termination device OTD2 has selected the SHA-1 hash function both as authentication code generation algorithm and as encryption key generation algorithm, while encryption key should be 128 bits in length. Therefore, both the OLT 100 and the optical termination device OTD2 know the encryption key generation algorithm they have to apply to generate the encryption key without the need to transmit the key through the ODN 10. For instance, a further information OTD2_A_S equal to "00001010" may indicate that the optical termination device OTD2 has selected the SHA-256 hash function as authentication code generation algorithm and the SHA-1 hash function as encryption key generation algorithm, while the encryption key should be 128 bits in length. Therefore, both the OLT 100 and the optical termination device OTD2 know that the hash generated by the encryption key generation function (which is 160 bits in length) should be truncated in order to have an encryption key of 128 bits in length. This is achieved by truncating the 32 most significant bits of the 160-bit output. For instance, a further information OTD2_A_S equal to "10001111" may indicate that the optical termination device OTD2 has selected the SHA-512 hash function as the authentication code generation algorithm. The hash should not be transmitted for entire (all the 512 bits), but it should be truncated to 128 bits. This is achieved by truncating the 384 most significant bits of the 512-bit output. For the encryption key generation, the optical termination device OTD2 and the OLT 100 have to generate a key which is 256 bits in length. However, as the SHA-1 algorithm is only able to generate a key which is 160 bits in length, the OLT 100 and the optical termination device OTD2 have to apply also an SHA interleave function. This type of function is for example described in paragraph 3.1 related to the SRP-SHA1 RFC2945 (available at http://www.ietf.org/rfc/rfc2945.txt at the date of filing of this application). The encryption key generated by the SHA interleave function is twice long than the 160-bit output of the SHA1 function, more specifically this key is 320 bits in length.

Because the encryption key should be 256 bits in length, the optical termination device OTD2 and the OLT 100 can use only the 64 most significant bits of the 320-bit outputted by the SHA1 interleave function.

Besides, preferably, the remaining nine octets of the Password message are used for transporting the authentication code AC* calculated by the optical termination device OTD2 during step 210, the second number C2 generated during step 208 and the registration identifier Reg-ID2 retrieved by the optical termination device OTD2 at step 207.

Because the remaining nine octets (72 bits) are not sufficient to transport all these information (AC2*, C2, Reg-ID2) by using only a single Password message, the second authentication message AM2 corresponds to a sequence of Password messages, each containing a fragment of the authentication code AC* or of the second number C2, or of the registration identifier Reg-ID2.

To this purpose, preferably, the octet 4 of each Password message contains a fragmentation index FI, identifying the type of information that is transported (the authentication code AC*, the second number C2, or the registration identifier Reg-ID2) by the Password message. Preferably, in case a fragment of the authentication code AC* is being transported, the fragmentation index FI also indicates which is the transported fragment.

The remaining eight octets 5-12 of the Password message preferably transport a fragment of the authentication code AC*, or of the second number C2, or of the registration identifier Reg-ID2, according to the indication provided by the fragmentation index FI. For example, the value "00000000" of the fragmentation index FI may indicate that a fragment of the registration identifier Reg-ID2 is transported in the remaining octet 5-12 of the Password message. On the other hand, the value "11111111" of the fragmentation index FI may indicate that the second number C2 is transported in the remaining octet 5-12 of the Password message. Further, the values comprise in the range "00000001"-"01111111" may indicate which fragment of the authentication code AC* is transported in the remaining octet 5-12 of the Password message.

More specifically, in case a MD5-128 hash function is used by the optical termination device OTD2 for generating an authentication code AC* of 128 bits, the second authentication message AM2 corresponds to a sequence of four Password messages. In particular, the first Password message has the octets 1 with the device identifier OTD2-ID, the octet 2 with the message type, the octet 3 with the further information OTD2_A_S indicative of the authentication code generation algorithm AAi and the encryption key generation algorithm EAj selected by the optical termination device OTD2, the octet 4 with a first fragmentation index FI (e.g. equal to "00000001") and the remaining eight octets 5-12 with the first 64 bits of the authentication code AC*. Besides, the second Password message has the octet 1 with the device identifier OTD2-ID of the optical termination device OTD2-ID, the octet 2 with the message type, the octet 3 with the further information OTD2_A_S indicative of the authentication code generation algorithm AAi and the encryption key generation algorithm EAj selected by the optical termination device OTD2, the octet 4 with a second fragmentation index (e.g. equal to "00000010") and the remaining eight octets 5-12 with the last 64 bits of the authentication code AC*. Besides, the third Password message has the octet 1 with the device identifier OTD2-ID of the optical termination device OTD2-ID, the octet 2 with the message type, the octet 3 with the further information OTD2_A_S indicative of the authentication code generation algorithm AAi and the encryption key generation algorithm EAj selected by the optical termination device OTD2, the octet 4 with a third fragmentation index (e.g. equal to "11111111") and the remaining eight octets 5-12 with the 64 bits of the second number C2 value. Besides, the fourth Password message has the octet 1 with the device identifier OTD2-ID of the optical termination device OTD2-ID, the octet 2 with the message type, the octet 3 with the further information OTD2_A_S indicative of the authentication code generation algorithm AAi and the encryption key generation algorithm EAj selected by the optical termination device OTD2, the octet 4 with a four fragmentation index (e.g. equal to "00000000") and the remaining eight octets 5-12 with the registration identifier Reg-ID2 value.

By referring again to FIG. 2, preferably, the optical termination device OTD2 transmits the second authentication message AM2, possibly in the form of one or more Password messages, to the OLT 100 (step 212).

When the OLT 100 receives the second authentication message AM2 from the optical termination device OTD2 (step 213), it preferably performs the following operations (step 214):

it retrieves from the second authentication message AM2 the further information OTD2_A_S indicative of the authentication code generation algorithm AAi, of the encryption key generation algorithm Eaj and of the length key selected by the optical termination device OTD2 during step 209. In this way, advantageously, the OLT 100 and the optical termination device OTD2 agree on a common type of authentication code generation algorithm and a common type of encryption key generation algorithm, as it will be discussed in further detail herein after;

it retrieves from the association table AT the secret code SC2 associated to the registration identifier Reg-ID2 of the optical termination device OTD2;

it retrieves from its local register the first number C1 it has generated for the optical termination device OTD2;

it retrieves from the second authentication message AM2 the second number C2; and it calculates a further authentication code AC by applying the authentication code generation algorithm AAi to the first number C1 and at least one of: the second number C2, the information OLT2_A_S, the further information ONT2_A_S, the identifier ONT-ID2 and the registration identifier Reg-ID2, by using the secret code SC2 as key for the authentication code generation algorithm AAi (step 214).

According to particularly preferred embodiments, the OLT 100 calculates the further authentication code AC by applying the authentication code generation algorithm AAi to the first number C1, the second number C2, the information OLT2_A_S, the further information ONT2_A_S, the identifier ONT-ID2 and the registration identifier Reg-ID2, by using the secret code SC2 as key for the authentication code generation algorithm AAi.

Then, preferably, the OLT 100 compares the authentication code AC* received from the optical termination device OTD2 with the further authentication code AC calculated during step 214 (step 215).

If the authentication code AC* is equal to the further authentication code AC, then the OLT 100 authenticates the optical termination device OTD2 (step 216). This condition is fulfilled only when the secret code SC2 used by the OLT 100 for calculating the further authentication code AC is equal to the further secret code SC2* input by the user at the optical termination device OTD2 and used by the optical termination device OTD2 for calculating the authentication code AC*. Having successful authenticated the optical termination device OTD2, the OLT 100 then preferably associates the serial number of the optical termination device OTD2, retrieved upon completion of step 200, to the registration identifier Reg-ID2.

The association between the serial number of the optical termination device OTD2 and the registration identifier Reg-ID2 is preferably permanently stored in a local register at the OLT 100. Such an association is preferably modified only in case the optical termination device OTD2 is replaced by another optical termination device, e.g. due to a failure.

Otherwise, if the authentication code AC* is not equal to the further authentication code AC, the OLT 100 preferably interrupts the authentication procedure (step 217). In this case, preferably, the OLT 100 sends a deactivation command to the optical termination device OTD2 and removes from its local register the association between the serial number of the optical termination device OTD2 (retrieved upon completion of step 200) and the device identifier OTD2-ID. Alternatively, during step 217 the OLT 100 may send to the optical termination device OTD2 a notification informing the user of the optical termination device OTD2 that the authentication procedure has not been successfully completed.

On the other hand, upon reception of the deactivation command, the optical termination device OTD2 preferably switches off its transmitter, thus stopping generating uplink traffic.

Therefore, advantageously, the method for authenticating the optical termination device OTD2 at the OLT 100 according to embodiments of the present invention is very robust against possible eavesdropping of the uplink and downlink traffic.

Indeed, advantageously, the optical termination device OTD2 and the OLT 100 do not exchange any information which, if eavesdropped by a hacker, allows him/her to authenticate at the OLT 100, e.g. by using an optical termination device of his own, or by stealing the optical termination device OTD2 and trying to access the PON 1 using it.

Indeed, authenticating requires the simultaneous knowledge of the further secret code SC2* equal to the secret code SC2, and of at least one of: the first number C1, the second number C2, the registration identifier Reg-ID2, the device identifier OTD2-ID, the information OLT_A_S and the further information OTD2_A_S defining the authentication code generation algorithm to be used for calculating the authentication code AC*.

Further, advantageously, the further secret code SC2* and the secret code SC2 can never be eavesdropped, since they are never transmitted in cleartext across the ODN 10. Therefore, even if a hacker succeeds in eavesdropping the first number C1 and/or the second number C2 and/or the registration Reg-ID2 and/or the device identifier OTD2-ID and/or the information OLT_A_S and/or the further information identifier OTD2_A_S, he/she can not repeat the authentication procedure by pretending to be the user of the optical termination device OTD2, since he/she is not able to calculate the authentication code AC*.

By increasing the number of information used by the OLT 100 and the optical termination device OTD2 for calculating the authentication code, the security of the PON 1 increases, since the number of information that a hacker must eavesdrop for being capable of calculating the authentication code increases.

Moreover, a hacker eavesdropping one or more of the information exchanged by the OLT 100 and the optical termination device OTD2 during the authentication procedure (i.e. the first number C1, the information OLT_A_S, the authentication code AC*, the registration identifier Reg-ID2, the device identifier OTD2-ID and the further information OTD2_A_S) can not obtain the further secret code SC2* starting from the eavesdropped information. This is advantageously due to the fact that the keyed hash message authentication code generation algorithm AAi uses a one-way hash function.

Therefore, advantageously, the above authentication method is very robust against eavesdropping.

Moreover, performing the strong authentication procedure immediately after the ranging procedure by means of the PLOAM messages (which are the only messages that can be transmitted over the network before authentication is completed), and permitting the transmission of the optical termination device only after the strong authentication procedure is successfully completed advantageously allows to provide a very secure mechanism for accessing the passive optical network. Indeed, since during the strong authentication procedure, the optical termination device is allowed to transmit only the PLOAM messages, while it is allowed to transmit traffic at higher layers only after is has been authenticated by the OLT there are no time periods during which the optical termination device, although not authenticated, can transmit higher layer traffic to the OLT.

After the optical termination device OTD2 is authenticated at the OLT 100, the OLT 100 has to be in turn authenticated at the optical termination device OTD2. Such a procedure will be referred to herein after as "counter-authentication". This advantageously allows a mutual authentication between the OLT 100 and the optical termination device OTD2 to be provided.

Figure 3:
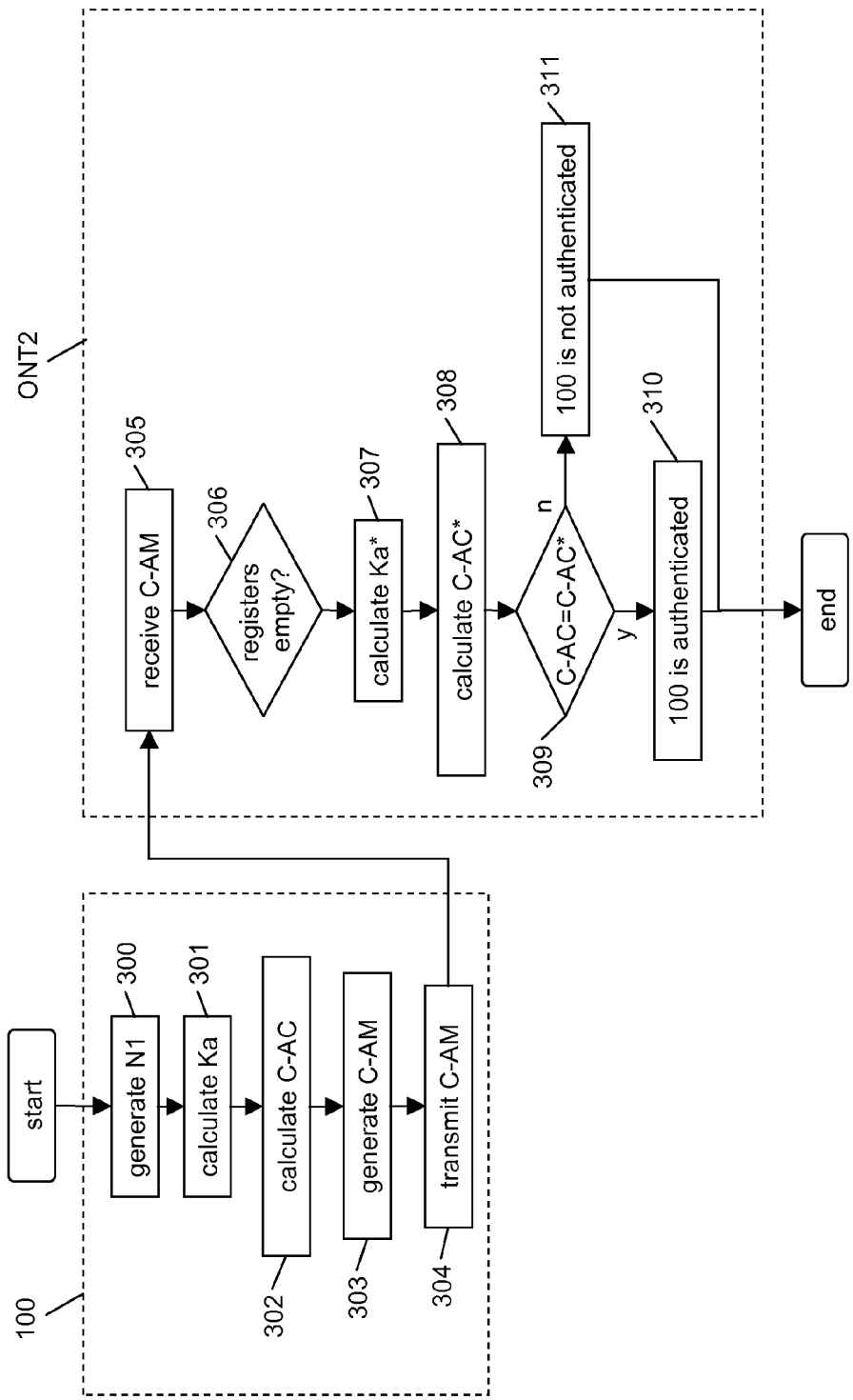
FIG. 3 is a flow chart of a procedure for counter-authenticating the OLT at the optical termination device.

In particular, by referring to FIG. 3 (in which steps 300 to 304 are performed by the OLT 100 and steps 305 to 310 are performed by the optical termination device OTD2), when the OLT 100 has successfully completed the authentication of the optical termination device OTD2 (see step 216 of FIG. 2), the OLT 100 preferably generates a first nonce ("Number used only ONCE") N1 (step 300). The first nonce N1 is preferably an integer number which is generated by the random number generation algorithm executed at the OLT 100. Preferably, during step 300 the OLT 100 stores the first nonce N1 in its local memory and it associates the first nonce N1 to the device identifier OTD2-ID.

Then, preferably, the OLT 100 calculates an authentication key Ka by applying the authentication code generation algorithm AAi which has been selected by the optical termination device OTD2 during step 209 to the first number C1, to the second number C2 and to at least one of: the information OLT_A_S and the further information OTD2_A_S, by using the secret code SC2 as key for the authentication code generation algorithm AAi (step 301).

According to particularly preferred embodiments, during step 301 the OLT 100 calculates the authentication key Ka by applying the authentication code generation algorithm AAi to the first number C1, the second number C2, the information OLT_A_S and the further information OTD2_A_S, by using the secret code SC2 as key for the authentication code generation algorithm AAi.

Then, preferably, the OLT 100 calculates a counter-authentication code C-AC (step 302) by applying to the first nonce N1 and to at least on of: the information OLT_A_S, the further information OTD2_A_S, the device identifier ONT2-ID and the registration identifier Reg-ID2 the authentication code generation algorithm AAi which has been selected by the optical termination device OTD2 during step 209, by using the authentication key Ka, calculated at the precedent step (301), as key for the authentication code generation algorithm AAi.

According to particularly preferred embodiments, during step 302 the OLT 100 calculates a counter-authentication code C-AC by applying the authentication code generation algorithm AAi to the first nonce N1, the information OLT_A_S, the further information OTD2_A_S, the device identifier OTD2-ID and the registration identifier Reg-ID2, by using the authentication key Ka as key for the authentication code generation algorithm AAi.

Then, preferably, the OLT 100 generates a counter-authentication message C-AM (step 303). Preferably, the counter-authentication message C-AM comprises:
  the first nonce N1; and
  the counter-authentication code C-AC.

Preferably, also the counter-authentication message C-AM is a PLOAM message. More preferably, the counter-authentication message C-AM is formatted similarly to a Request_Key message as defined by the ITU-T Recommendation G.984.3 (February 2004), paragraph 9.2.3.13. In particular, the ITU-T Recommendation G.984.3 (February 2004), paragraph 9.2.3.13 discloses that a Request_Key message has twelve octets: the octet 1 includes the device identifier OTD2-ID of the optical termination device to which the Request_Key message is addressed, the octet 2 includes the message type ("00001101" indicates a Request_Key message), while the other ten octets are unspecified.

According to embodiments of the present invention, the structure of the counter-authentication message C-AM implemented as a Request_Key message is shown in FIG. 6a.

As shown in FIG. 6a, the octets 1 and 2 of the counter-authentication message C-AM are compliant with the ITU-T Recommendation G.984.3 (February 2004), paragraph 9.2.3.13, while the remaining ten octets are used for transporting the first nonce N1 and/or the counter-authentication code C-AC.

In particular, since the overall length (expressed in bits) of the first nonce N1 and the counter-authentication code C-AC may be higher than 80 bits (i.e. ten octets), the counter-authentication message C-AM corresponds to a sequence of Request_Key messages, each containing a respective fragment either of the first nonce N1 or of the counter-authentication code C-AC.

More particularly, preferably, the octet 3 of each Request_Key message comprises a first nonce fragmentation index N1-FI, which is indicative of the fragment of the first nonce N1 which is transported by the Request_Key message. Besides, preferably, the octet 4 of each Request_Key message comprises a counter-authentication code fragmentation index C-AC-FI, which is indicative of the fragment of the counter-authentication code C-AC which is transported by the Request_Key message. Preferably, the remaining eight octets 5-12 of the Request_Key message are used for transporting either a fragment of the first nonce N1 value or a fragment of the counter-authentication code C-AC.

For instance, when the first nonce fragmentation index N1-FI of a Request_Key message is equal to "00000001", it indicates that the Request_Key message is transporting the first fragment of the first nonce N1. When the first nonce fragmentation index N1-FI of a Request_Key message is equal to "00000010", it indicates that the Request_Key message is transporting the second fragment of the first nonce N1. And so on, until the last fragment of the first nonce N1 is transported. Besides, when the first nonce fragmentation index N1-FI has a value indicating that the Request_Key message is transporting a given fragment of the first nonce N1, the counter-authentication code fragmentation index C-AC-FI preferably has a predefined value (e.g. "00000000") indicating that the Request_Key message is not transporting any fragment of the counter-authentication code C-AC.

Similarly, when the counter-authentication code fragmentation index C-AC-FI of a Request_Key message is equal to "00000001", it indicates that the Request_Key message is transporting the first fragment of the counter-authentication code C-AC. When the counter-authentication code fragmentation index C-AC-FI of a Request_Key message is equal to "00000010", it indicates that the Request_Key message is transporting the second fragment of the counter-authentication code C-AC. And so on, until the last fragment of the counter-authentication code C-AC is transported. Preferably, when the counter-authentication code fragmentation index C-AC-FI has a value indicating that the Request_Key message is transporting a given fragment of the counter-authentication code C-AC, the first nonce fragmentation index N1-FI has a predefined value (e.g. "00000000") indicating that the Request_Key message is not transporting any fragment of the first nonce N1.

By referring again to FIG. 3, preferably, the OLT 100 transmits the counter-authentication message C-AM, possibly in the form of one or more Request_Key messages, to the optical termination device OTD2 (step 304).

When the optical termination device OTD2 receives the counter-authentication message C-AM (step 305), it preferably retrieves from it the first nonce N1.

Then it checks in its registers (the shadow_key_register and the active_key register) if there is any encryption key stored (step 306).

If the registers are empty, the optical termination device OTD2 calculates a further authentication key Ka* (step 307) before validating the counter-authentication code C-AC value. This happens every time a full authentication procedure is executed between the OLT 100 and the optical termination device OTD2, that means every time that the optical termination device OTD2 receives a first authentication message AM1 (implemented as a Request Password) that resets any encryption key stored in its registers. This happens also in other cases, for instance when an updating of the encryption key is required without the need to perform the full authentication. In this case, the optical termination device OTD2 does not receive the first authentication message AM1 (implemented as a Request Password) but only the counter-authentication message C-AM (implemented as a Request_Key) and it does not calculate the further authentication key Ka* before to validate the received counter-authentication code C-AC value because the registers of the optical termination device OTD2 are not empty and the encryption key retrieved from the active_key_register is used as an authentication key. The procedure for updating the encryption key it will be described later in more details.

At step 307 (if the key registers are empty) the optical termination device OTD2 preferably calculates the further authentication key Ka* by applying the authentication code generation algorithm AAi selected during step 209 to the first number C1, to the second number C2 and to at least one of: the information OLT_A_S and the further information OTD2_A_S, by using the secret code SC2* as a key for the authentication code generation algorithm AAi.

According to particularly preferred embodiments, during step 307 the optical termination device OTD2 calculates the further authentication key Ka* by applying the authentication code generation algorithm AAi to the first number C1, the second number C2, the information OLT_A_S and the further information OTD2_A_S, by using the secret code SC2* as a key for the authentication code generation algorithm AAi.

Then, the optical termination device OTD2 preferably computes a further counter-authentication code C-AC* (step 308) by applying the authentication code generation algorithm AAi selected during step 209 to the first nonce N1 and at least one of: the information OLT_A_S, the further information OTD2_A_S, the device identifier OTD2-ID and the registration identifier Reg-ID2, by using the further authentication key Ka* computed during the step 307 as a key for the authentication code generation algorithm AAi.

According to particularly preferred embodiments, during step 308 the optical termination device OTD2 preferably computes the further counter-authentication code C-AC* by applying the authentication code generation algorithm AAi to the retrieved first nonce N1, the information OLT_A_S, the further information OTD2_A_S, the device identifier OTD2-ID and the registration identifier Reg-ID2, by using the further authentication key Ka* as a key for the authentication code generation algorithm AAi.

Then, preferably, at a step 309, the optical termination device OTD2 compares the counter-authentication code C-AC received from the OLT 100 with the further counter-authentication code C-AC* calculated during step 308.

If the counter-authentication code C-AC is equal to the further counter-authentication code C-AC*, then the optical termination device OTD2 authenticates the OLT 100 (step 310). Again, this condition is fulfilled only when the secret code SC2 used by the OLT 100 for calculating the authentication key Ka is equal to the further secret code SC2* input by the user at the optical termination device OTD2 and used by the optical termination device OTD2 for calculating the further authentication key Ka*.

Otherwise, the optical termination device OTD2 preferably interrupts the counter-authentication procedure (step 311).

Therefore, advantageously, the procedure for counter-authenticating the OLT 100 at the optical termination device OTD2 according to this embodiment is also robust against possible eavesdropping of the uplink and downlink traffic.

Indeed, advantageously, also during the counter-authentication procedure, the optical termination device OTD2 and the OLT 100 do not exchange any information which, if eavesdropped by a hacker, allows him/her to authenticate at the optical termination device OTD2, e.g. by pretending to be the service provider (i.e. the OLT 100).

Indeed, also the counter-authentication requires the knowledge of one or more of the first nonce N1, the information OLT_A_S, the further information OTD2_A_S, the device identifier OTD2-ID and the registration identifier Reg-ID2. Further, the computation of the authentication key Ka depends on the knowledge of the secret code SC2, and of one or more of the other parameters exchanged between the OLT and the optical termination device OTD2 during the precedent steps (first number C1 and/or second number C2 and/or information OLT_A_S and/or further information OTD2_A_S). It can be noted that the secret code SC2 can never be eavesdropped, since it is never transmitted in cleartext across the ODN 10. Therefore, even if a hacker succeeds in eavesdropping the first nonce N1 and/or the information OLT_A_S and/or the further information OTD2_A_S and/or the device identifier OTD2-ID and/or the registration identifier Reg-ID2 value, he/she can not repeat the counter-authentication procedure by pretending to be the service provider (i.e. the OLT 100), since he/she is not able to calculate the counter-authentication code C-AC.

Moreover, a hacker eavesdropping one or more of the information exchanged by the OLT 100 and the optical termination device OTD2 during the counter-authentication procedure (i.e. the first nonce N1 and/or the information OLT_A_S, the further information OTD2_A_S and/or the device identifier OTD2-ID and/or the registration identifier Reg-ID2) can not trace the secret code SC2 starting from the eavesdropped information. This is advantageously due to the fact that the HMAC code generation algorithm AAi uses a one-way hash function.

After the OLT 100 is counter-authenticated at the optical termination device OTD2 (step 310), a procedure for generating an encryption key may be performed at the optical termination device OTD2. Such an encryption key may be used in particular for encrypting downlink traffic directed to the optical termination device OTD2 which, as mentioned above, is particularly vulnerable to eavesdropping.

Figure 4:
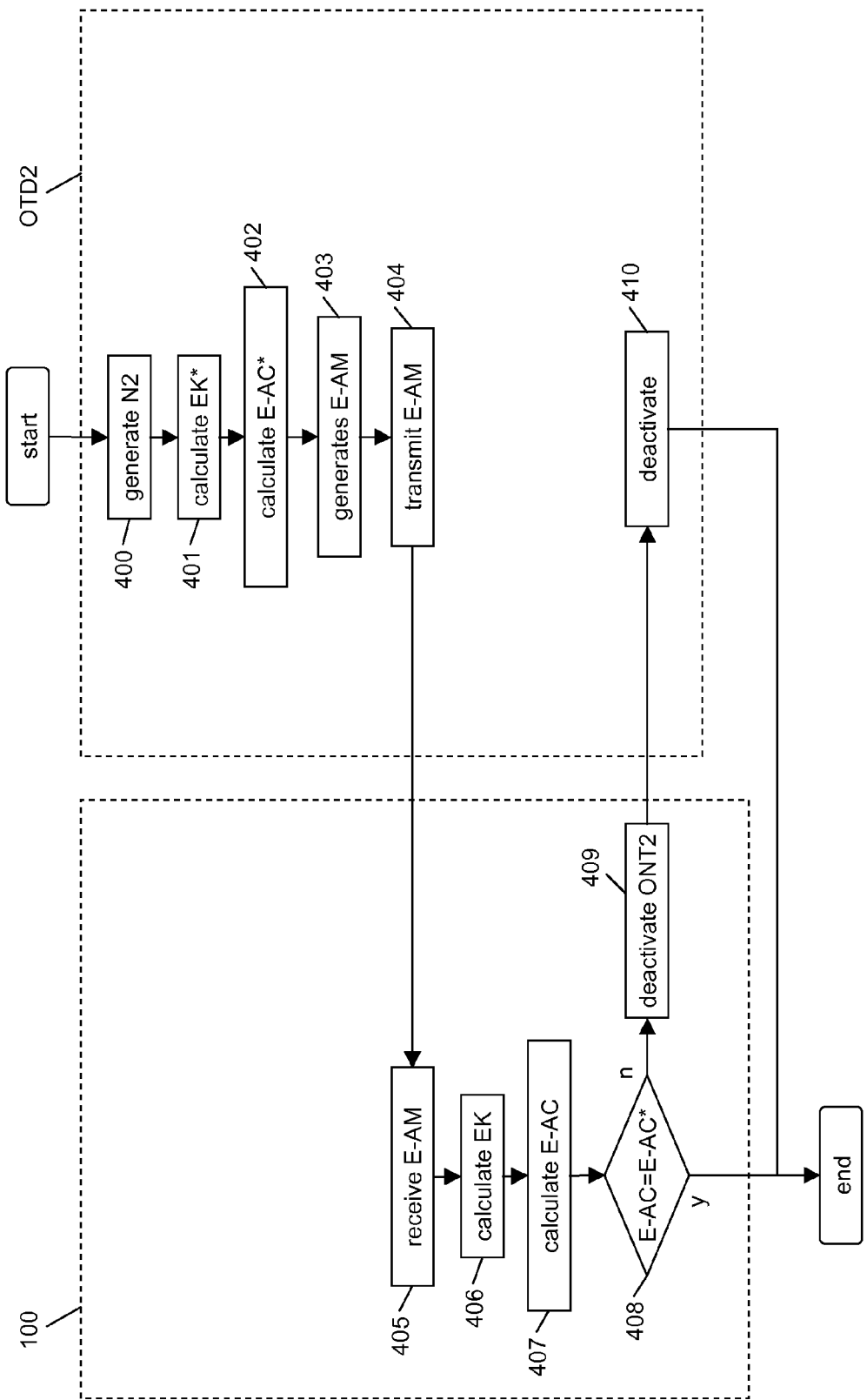
FIG. 4 is a flow chart of a procedure for generating an encryption key at the OLT and at the optical termination device.

In particular, by referring to FIG. 4 (in which steps 400 to 404 and 410 are performed by the optical termination device OTD2 and steps 405 to 409 are performed by the OLT 100), when the optical termination device OTD2 has successfully completed the counter-authentication of the OLT 100 (see step 310 of FIG. 3), the optical termination device OTD2 preferably generates a second nonce N2 (step 400). The second nonce N2 is preferably an integer number which is generated by a random number generation algorithm executed at the optical termination device OTD2.

Then, preferably, the optical termination device OTD2 calculates an encryption key EK* by applying the specific encryption key generation algorithm EAj selected by the optical termination device OTD2 during step 209 to the first nonce N1, the second nonce N2, and at least one of: the information OLT_A_S, the further information OTD2_A_S and the device identifier OTD2-ID, by using the secret code SC2* as a key for the encryption key generation algorithm EAj.

According to particularly preferred embodiments, during step 401 the optical termination device OTD2 calculates the encryption key EK* by applying the encryption key generation algorithm EAj to the first nonce N1, the second nonce N2, the information OLT_A_S, the further information OTD2_A_S and the device identifier OTD2-ID, by using the secret code SC2* as a key for the encryption key generation algorithm EAj.

Then, preferably, the optical termination device OTD2 calculates an encryption-authentication code E-AC* by applying the authentication code generation algorithm AAi selected by the optical termination device OTD2 during step 209 to the first nonce N1, the second nonce N2 and at least one of: the information OLT_A_S, the further information OTD2_A_S, the device identifier OTD2-ID, the registration identifier Reg-ID2 and the authentication key Ka* retrieved at step 307, by using the further encryption key EK* as a key for the authentication code generation algorithm AAi (step 402).

According to particularly preferred embodiments, during step 402 the optical termination device OTD2 calculates the encryption-authentication code E-AC* by applying the authentication code generation algorithm AAi to the first nonce N1, the second nonce N2, the information OLT_A_S, the further information OTD2_A_S, the device identifier OTD2-ID, the registration identifier Reg-ID2 and the authentication key Ka*, by using the further encryption key EK* as a key for the authentication code generation algorithm AAi.

Then, preferably, the optical termination device OTD2 generates an encryption-authentication message E-AM (step 403). Preferably, the encryption-authentication message E-AM comprises:
the second nonce N2; and
the encryption-authentication code E-AC*.

Preferably, also the encryption-authentication message E-AM is a PLOAM (Physical Layer Operations And Maintenance) message. More preferably, the encryption-authentication message E-AM is formatted similarly to an Encryption_Key message as defined by the ITU-T Recommendation G.984.3 (February 2004), paragraph 9.2.4.5. In particular, the ITU-T Recommendation G.984.3 (February 2004), paragraph 9.2.4.5 discloses that an Encryption_Key message has twelve octets: the octet 1 includes the device identifier OTD2-ID of the optical termination device which generates the Encryption_Key message, the octet 2 includes the message type ("00000101" indicates an Encryption_Key message) and the octet 3 includes a Key_Index KI indicative of the key type. The Key_Index KI indicates the key to which a given fragment belongs. Preferably, the Key_Index KI is incremented each time the encryption key is updated. Further, preferably, the octet 4 includes a Frag_Index FI indicative of the fragment of the encryption key that the Encryption_Key message transports, while the remaining eight octets 5-12 include the fragments of the encryption key.

According to embodiments of the present invention, the structure of the encryption-authentication message E-AM implemented as an Encryption_Key message is shown in FIG. 6b.

As shown in FIG. 6b, the first four octets of the encryption-authentication message E-AM are compliant with the ITU-T Recommendation G.984.3 (February 2004), paragraph 9.2.4.5, while the remaining eight octets may be used for transporting either a fragment of the second nonce N2 or a fragment of the encryption-authentication code E-AC*.

In particular, in order to distinguish the Encryption_Key messages transporting a fragment of the second nonce N2 from those transporting a fragment of the encryption-authentication code E-AC*, the possible values of the octet 4 including the Frag_Index FI are divided in two ranges. A first range of values (e.g. from "00000000" to "01111111") indicates that a fragment of the encryption-authentication code E-AC* is included in the Encryption_Key message. A second range of values (e.g. from "10000000" to "11111111") indicates that a fragment of the second nonce N2 is included in the Encryption_Key message. Accordingly, the remaining octets 5-12 of the Encryption_Key message may include either a fragment of the encryption-authentication code E-AC*, or a fragment of the second nonce N2.

By referring again to FIG. 4, then, preferably, the optical termination device OTD2 transmits the encryption-authentication message E-AM, possibly in the form of one or more Encryption_Key messages, to the OLT 100 (step 404).

When the OLT 100 receives the encryption-authentication message E-AM (step 405), it preferably retrieves from its local register the second nonce N2; then it calculates the encryption key EK by applying the specific encryption key generation algorithm EAj selected by the optical termination device OTD2 during step 209 to the first nonce N1, the second nonce N2 and at least one of: the information OLT_A_S, the further information OTD2_A_S and the device identifier OTD2-ID, by using the secret code SC2 as a key for the encryption key generation algorithm EAj (step 406).

According to particularly preferred embodiments, during step 406 the OLT 100 calculates the encryption key EK by applying the encryption key generation algorithm EAj to the first nonce N1, the second nonce N2, the information OLT_A_S, the further information OTD2_A_S and the device identifier OTD2-ID, by using the secret code SC2 as a key for the encryption key generation algorithm EAj.

Then, preferably, the OLT 100 calculates a further encryption-authentication code E-AC by applying the authentication code generation algorithm AAi selected during step 209 to the first nonce N1, the second nonce N2, and at least one of: the information OLT_A_S, the further information OTD2_A_S, the device identifier OTD2-ID, the registration identifier Reg-ID2 and the authentication key Ka generated at step 301, by using the further encryption key EK as a key for the authentication code generation algorithm AAi (step 407).

According to particularly preferred embodiments, during step 407 the OLT 100 calculates the further encryption-authentication code E-AC by applying the authentication code generation algorithm AAi to the first nonce N1, the second nonce N2, the information OLT_A_S, the further information OTD2_A_S, the device identifier OTD2-ID, the registration identifier Reg-ID2 and the authentication key Ka generated at step 301, by using the further encryption key EK as a key for the authentication code generation algorithm AAi.

Then, preferably, the OLT 100 compares the encryption-authentication code E-AC* received from the optical termination device OTD2 with the further encryption-authentication code E-AC calculated during step 407 (step 408).

Again, this condition is fulfilled only when the secret code SC2 used by the OLT 100 for calculating the further encryption key EK, which is then used as a key for the encryption-authentication code E-AC calculation, is equal to the further secret code SC2* input by the user at the optical termination device OTD2 and used by the optical termination device OTD2 for calculating the encryption key EK* which is then used as a key for the encryption-authentication code E-AC*. In this case, the encryption key EK* and the further encryption key EK calculated by the optical termination device OTD2 and the OLT 100, respectively, have the same value.

If the encryption-authentication code E-AC* is equal to the further encryption-authentication code E-AC, then the full authentication procedure ends. Then, preferably, the OLT 100 and the optical termination device OTD2 store the encryption key EK in the respective shadow_key_register. As described in the ITU-T Recommendation G.984.3 (February 2004), paragraph 12.3, the OLT 100 chooses a frame number in the future to be the first frame that uses the generated encryption key. It transmits the number of this frame (i.e. the number of the first frame to be encrypted using the encryption key) to the optical termination device OTD2 using a Key_Switching_Time message. At the beginning of the chosen frame, both the OLT 100 and the optical termination device OTD2 copy the contents of the shadow_key_register into the active_key_register. In this way both the OLT 100 and the optical termination OTD2 begin using the generated encryption key at precisely at the same frame.

Otherwise, if the encryption-authentication code E-AC* is not equal to the further encryption-authentication code E-AC, the OLT 100 preferably interrupts the procedure of generating the encryption key (step 409). In this case, preferably, the OLT 100 sends a deactivation command to the optical termination device OTD2 and removes from its local register the association between the serial number and the device identifier OTD2-ID of the optical termination device OTD2. On the other hand, upon reception of the deactivation command (step 410), the optical termination device OTD2 preferably switches off its transmitter, thus stopping generating uplink traffic. Alternatively, during step 409, the OLT 100 may send to the optical termination device OTD2 a notification informing the user of the optical termination device OTD2 that the procedure for generating the encryption key has not been successfully completed.

Therefore, advantageously, also the above procedure for generating the encryption key is very robust against possible eavesdropping of the uplink and downlink traffic.

Indeed, advantageously, also during the procedure of generating the encryption key the optical termination device OTD2 and the OLT 100 do not exchange any information which, if eavesdropped by a hacker, allows him/her to recover the encryption key and use it for decrypting the encrypted traffic.

Indeed, the calculation of the encryption key requires the simultaneous knowledge of the secret code SC2 and of at least one of the first nonce N1, the second nonce N2, the encryption key generation algorithm to be used, in particular the information OLT_A_S and the further information OTD2_A_S. Further, advantageously, the secret code SC2 can never be eavesdropped, since it is never transmitted in cleartext across the ODN 10. Therefore, even if a hacker succeeds in eavesdropping the first nonce N1 (during the counter-authentication procedure of FIG. 3) and/or the second nonce N2 (during the procedure of generating the encryption key of FIG. 4) and/or the information OLT_A_S and/or the further information OTD2_A_S and the device identifier OTD2-ID (during the authentication procedure of FIG. 2), he/she can not calculate the encryption key EK* (and the further encryption key EK).

Moreover, a hacker eavesdropping one or more of the information exchanged by the OLT 100 and the optical termination device OTD2 during the authentication procedure, or the counter-authentication procedure or the procedure for generating the encryption key can not trace the secret code SC2 starting from the eavesdropped information. This is advantageously due to the fact that the authentication code generation algorithm AAi is a one-way hash function.

By referring now to FIG. 7, the method for updating an encryption key EK used between the OLT 100 and the optical termination device OTD2 will be described in detail.

The procedure for updating the encryption key EK is started by the OLT 100 which sends to the optical termination device OTD2 a counter authentication message C_AM implemented as a Key_Request message.

Figure 7:
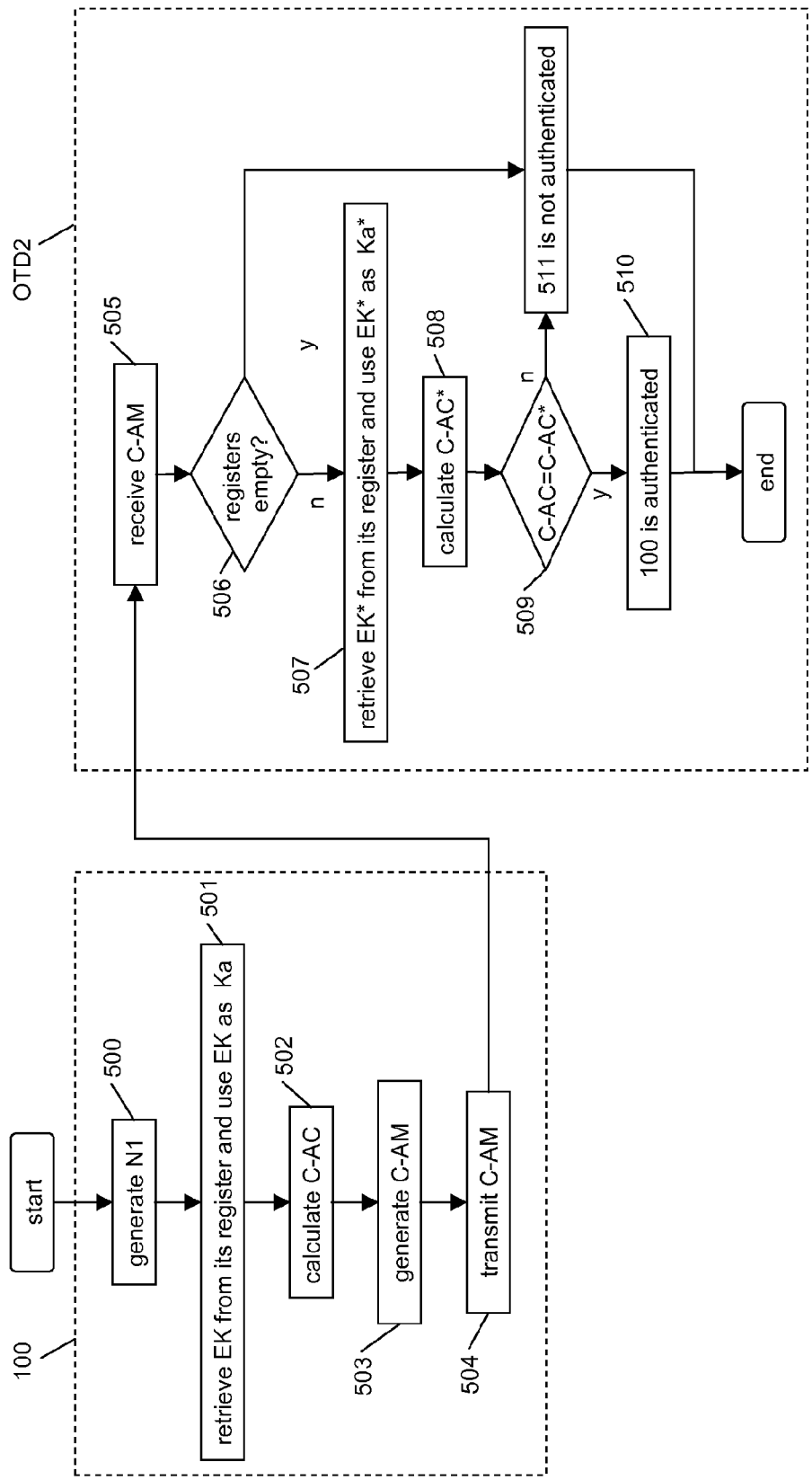
FIG. 7 is a flow chart of a procedure for counter-authenticating the OLT at the optical termination device during the encryption key updating procedure.

In particular, by referring to FIG. 7 (in which steps 500 to 504 are performed by the OLT 100 and steps 505 to 510 are performed by the optical termination device OTD2), when the OLT 100 wishes the optical termination device ONT2 to calculate a new encryption key EK, the OLT 100 preferably generates a new first nonce N1 (step 500), whose value is likely to be different from that of the first nonce N1 generated during step 300. The first nonce N1 is preferably an integer number which is generated by a random number generation algorithm executed at the OLT 100. Preferably, during step 500 the OLT 100 stores the new first nonce N1 in its local memory (thus overwriting the previous value of the first nonce N1 generated at step 300) and it associates the new first nonce N1 to the device identifier OTD2-ID.

Then, preferably, at a step 501, the OLT 100 retrieves from one of its registers, in particular the active_key_register, the encryption key EK it is using with the optical termination device OTD2, identified by the identifier OTD2_ID.

The encryption key EK is used to calculates a counter-authentication code C-AC (step 502). Specifically, the counter-authentication code C-AC is computed by applying the authentication code generation algorithm AAi, selected by the optical termination device OTD2 at step 209, to at least one of: the new first nonce N1, the information OLT_A_S, the further information OTD2_A_S, the device identifier OTD2-ID and the registration identifier Reg-ID2, by using the encryption key EK as a key for the authentication code generation algorithm AAi.

According to particularly preferred embodiments, during step 502 the counter-authentication code C-AC is computed by applying the authentication code generation algorithm AAi to the new first nonce N1, the information OLT_A_S, the further information OTD2_A_S, the device identifier OTD2-ID and the registration identifier Reg-ID2, by using the encryption key EK as a key for the authentication code generation algorithm AAi.

Then, preferably, the OLT 100 generates a counter-authentication message C-AM (step 503). Preferably, the counter-authentication message C-AM comprises:

the new first nonce N1; and
the counter-authentication code C-AC.

Preferably, as mentioned above, the counter-authentication message C-AM is a PLOAM message. More preferably, the counter-authentication message C-AM is formatted similarly to a Request_Key message as defined by the ITU-T Recommendation G.984.3 (February 2004), paragraph 9.2.3.13. In particular, the ITU-T Recommendation G.984.3 (February 2004), paragraph 9.2.3.13 discloses that a Request_Key message has twelve octets: the octet 1 includes the identifier (OTD2-ID) of the optical termination device to which the Request_Key message is addressed, the octet 2 includes the message type ("00001101" indicates a Request_Key message), while the other ten octets are unspecified.

According to the present invention, the structure of the counter-authentication message C-AM implemented as a Request_Key message is shown in FIG. 6a.

As shown in FIG. 6a, the octets 1 and 2 of the counter-authentication message C-AM are compliant with the ITU-T Recommendation G.984.3 (February 2004), paragraph 9.2.3.13, while the remaining ten octets are used for transporting the new first nonce N1 and/or the counter-authentication code C-AC.

In particular, since the overall length (expressed in bits) of the new first nonce N1 and the counter-authentication code C-AC is generally higher than 80 bits (i.e. ten octets), the counter-authentication message C-AM corresponds to a sequence of Request_Key messages, each containing a respective fragment either of the new first nonce N1 or of the counter-authentication code C-AC.

More particularly, preferably, the octet 3 of each Request_Key message comprises a first nonce fragmentation index N1-FI, which is indicative of the fragment of the new first nonce N1 which is transported by the Request_Key message. Besides, preferably, the octet 4 of each Request_Key message comprises a counter-authentication code fragmentation index C-AC-FI, which is indicative of the fragment of the counter-authentication code C-AC which is transported by the Request_Key message. Preferably, the remaining eight octets 5-12 of the Request_Key message are used for transporting either a fragment of the new first nonce N1 value or a fragment of the counter-authentication code C-AC.

When the optical termination device OTD2 receives the counter-authentication message C-AC (step 505), it preferably retrieves from it the new first nonce N1.

Then it checks in its registers (the shadow_key_register and the active_key register) if there is stored any encryption key (step 506).

If the registers are not empty, the optical termination device OTD2 then changes the encryption key EK* (step 307) before validating the counter-authentication code C-AC value. Preferably, in this case the optical termination device OTD2 does not calculate a further authentication key Ka* as described in the full-authentication procedure (referring to FIG. 3, see step 307) before validating the received counter-authentication code C-AC value. This is due to the fact that the registers of the optical termination device OTD2 are not empty and the encryption key stored in the registers is used as an authentication key.

Then, at step 507, the optical termination device OTD2 retrieves the encryption key EK* from its active_register_key. Then, preferably, it computes, at a step 508, a further counter-authentication code C-AC* by applying the authentication code generation algorithm AAi, selected by the optical termination device OTD2 during step 209, to at least one of: the retrieved new first nonce N1, the information OLT_A_S, the further information OTD2_A_S, the device identifier OTD2-ID and the registration identifier Reg-ID2, by using the encryption key EK*, retrieved during step 507, as a key for the authentication code generation algorithm AAi.

According to particularly preferred embodiments, during step 507 the optical termination device OTD2 computes the further counter-authentication code C-AC* by applying the authentication code generation algorithm AAi to the new first nonce N1, the information OLT_A_S, the further information OTD2_A_S, the device identifier OTD2-ID and the registration identifier Reg-ID2, by using the encryption key EK* as a key for the authentication code generation algorithm AAi.

Then, at a step 509, the optical termination device OTD2 compares the counter-authentication code C-AC received from the OLT 100 with the further counter-authentication code C-AC*.

If the counter-authentication code C-AC is equal to the further counter-authentication code C-AC*, then the optical termination device OTD2 authenticates the OLT 100 and its request to renew the encryption key EK (step 510). Again, this condition is fulfilled only when the encryption key EK used by the OLT 100 for calculating the counter-authentication code C-AC is equal to the encryption key EK* used by the optical termination device OTD2.

Otherwise, the optical termination device OTD2 preferably interrupts the counter-authentication procedure (step 511).

After the OLT 100 is counter-authenticated at the optical termination device OTD2 (step 510), a procedure for generating a new encryption key may be performed at the optical termination device OTD2.

Figure 8:
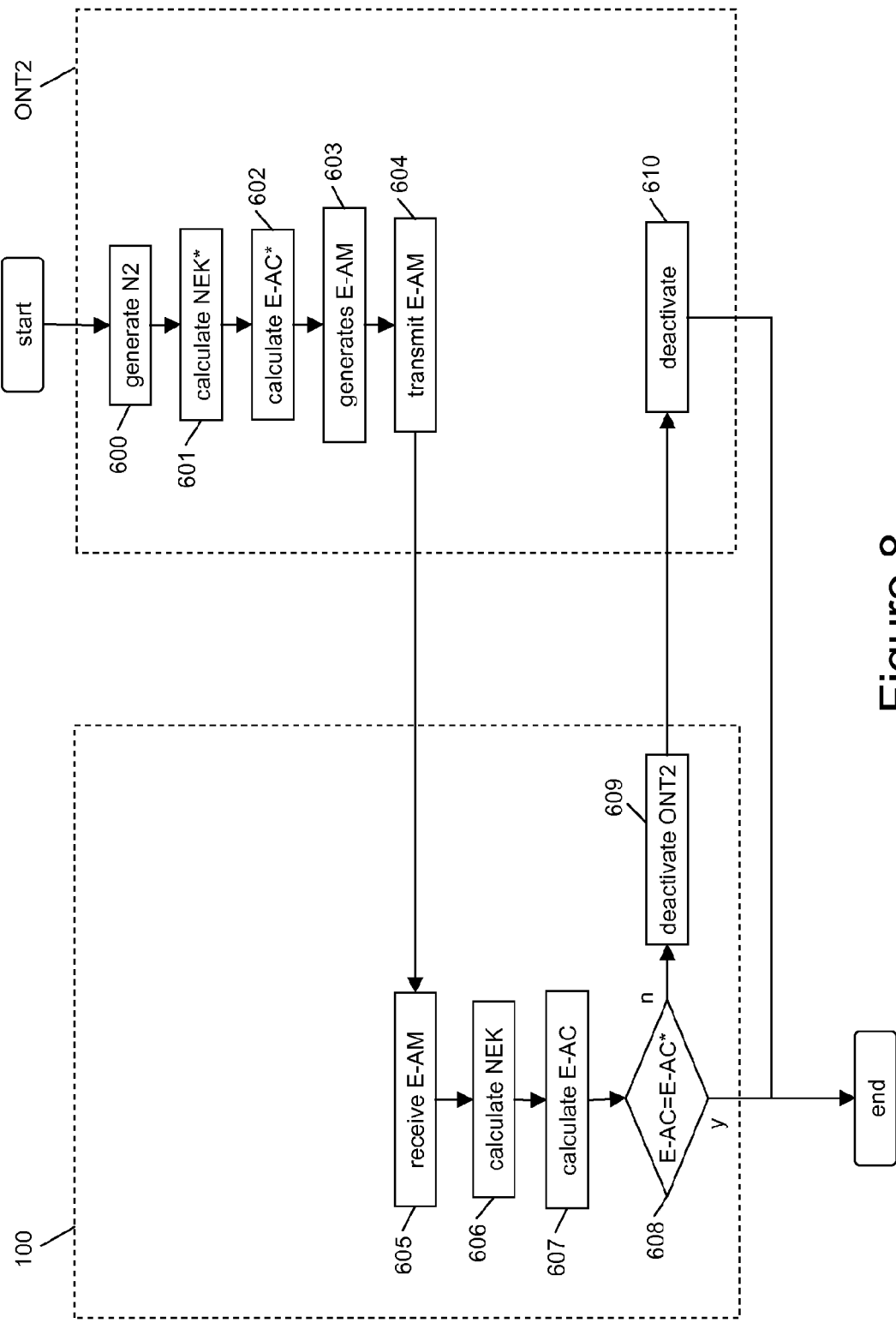
FIG. 8 is a flow chart of a procedure for generating a new encryption key at the OLT and at the optical termination device during the encryption key updating procedure.

In particular, by referring to FIG. 8 (in which steps 600 to 604 and 610 are performed by the optical termination device OTD2 and steps 605 to 609 are performed by the OLT 100), when the optical termination device OTD2 has successfully completed the counter-authentication of the OLT 100 (see step 510 of FIG. 7), the optical termination device OTD2 preferably generates a new second nonce N2 (step 600), whose value is likely to be different from that of the second nonce N2 generated during step 400. The new second nonce N2 is preferably an integer number which is generated by a random number generation algorithm executed at the optical termination device OTD2.

Then, preferably, the optical termination device OTD2 calculates the new encryption key NEK* applying the encryption key generation algorithm EAj, selected by the optical termination device OTD2 during step 209, to at least one of: the new first nonce N1, the new second nonce N2, the information OLT_A_S, the further OTD2_A_S and the device identifier OTD2-ID, by using the secret code SC2* as a key for the encryption key generation algorithm EAj (step 601).

According to particularly preferred embodiments, during step 601 the optical termination device OTD2 calculates the new encryption key NEK* applying the encryption key generation algorithm EAj to the new first nonce N1, the new second nonce N2, the information OLT_A_S, the further OTD2_A_S and the device identifier OTD2-ID, by using the secret code SC2* as a key for the encryption key generation algorithm EAj.

Then, preferably, the optical termination device OTD2 calculates an encryption-authentication code E-AC* by applying the authentication code generation algorithm AAi, selected by the optical termination device OTD2 during step 209, to at least one of: the new first nonce N1, the new second nonce N2, the information OLT_A_S, the further information OTD2_A_S, the device identifier OTD2-ID, the registration identifier Reg-ID2 and the encryption key EK*, by using the new encryption key NEK* as a key for the authentication code generation algorithm AAi (step 602).

According to particularly preferred embodiments, during step 602 the optical termination device OTD2 calculates an encryption-authentication code E-AC* by applying the authentication code generation algorithm AAi to the new first nonce N1, the new second nonce N2, the information OLT_A_S, the further information OTD2_A_S, the device identifier OTD2-ID, the registration identifier Reg-ID2 and the encryption key EK*, by using the new encryption key NEK* as a key for the authentication code generation algorithm AAi.

Then, preferably, the optical termination device OTD2 generates an encryption-authentication message E-AM (step 403). Preferably, the encryption-authentication message E-AM comprises:

the new second nonce N2; and the encryption-authentication code E-AC*.

Preferably, as mentioned above, also the encryption-authentication message E-AM is a PLOAM message. More preferably, the encryption-authentication message E-AM is formatted similarly to an Encryption_Key message as defined by the ITU-T Recommendation G.984.3 (February 2004), paragraph 9.2.4.5. In particular, the ITU-T Recommendation G.984.3 (February 2004), paragraph 9.2.4.5 discloses that an Encryption_Key message has twelve octets: the octet 1 includes the device identifier OTD2-ID of the optical termination device which generates the Encryption_Key message, the octet 2 includes the message type ("00000101" indicates an Encryption_Key message), the octet 3 includes a Key_Index KI indicative of the key type, the octet 4 includes a Frag_Index FI indicative of the fragment of the encryption key that the Encryption_Key message transports, while the remaining eight octets 5-12 include the fragments of the encryption key.

According to embodiments of the present invention, the structure of the encryption-authentication message E-AM, implemented as an Encryption_Key message, is shown in FIG. 6b.

As shown in FIG. 6b, the first four octets of the encryption-authentication message E-AM are compliant with the ITU-T Recommendation G.984.3 (February 2004), paragraph 9.2.4.5, while the remaining eight octets may be used for transporting either a fragment of the new second nonce N2 or a fragment of the encryption-authentication code E-AC*.

In particular, in order to distinguish the Encryption_Key messages transporting a fragment of the new second nonce N2 from those transporting a fragment of the encryption-authentication code E-AC*, the possible values of the octet 4 including the Frag_Index FI are divided in two ranges. A first range of values (e.g. from "00000000" to "01111111") indicates that a fragment of the encryption-authentication code E-AC* is included in the Encryption_Key message. A second range of values (e.g. from "10000000" to "11111111") indicates that a fragment of the new second nonce N2 is included in the Encryption_Key message. Accordingly, the remaining octets 5-12 of the Encryption_Key message may include either a fragment of the encryption-authentication code E-AC*, or a fragment of the new second nonce N2.

When the OLT 100 receives the encryption-authentication message E-AM (step 605), it preferably retrieves from it the new second nonce N2 and then it calculates the new encryption key NEK by applying the encryption key generation algorithm EAj selected by the optical termination device OTD2 during step 209 to at least one of: the new first nonce N1, the new second nonce N2, the information OLT_A_S, the further information OTD2_A_S and the device identifier OTD2-ID, by using the secret code SC2 as a key for the encryption key generation algorithm EAj (step 606).

According to particularly preferred embodiments, during step 606 the OLT 100 calculates the new encryption key NEK by applying the encryption key generation algorithm EAj to the new first nonce N1, the new second nonce N2, the information OLT_A_S, the further information OTD2_A_S and the device identifier OTD2-ID, by using the secret code SC2 as a key for the encryption key generation algorithm EAj.

Then, preferably, the OLT 100 calculates a further encryption-authentication code E-AC by applying the authentication code generation algorithm AAi selected by the optical termination device OTD2 during step 209 to at least one of: the new first nonce N1, the new second nonce N2, the information OLT_A_S, the further information OTD2_A_S, the device identifier OTD2-ID, the registration identifier Reg-ID2 and the previous encryption key EK, by using the new encryption key NEK, calculated at step 606, as a key for the authentication code generation algorithm AAi (step 607).

According to particularly preferred embodiments, during step 607 the OLT 100 calculates the further encryption-authentication code E-AC by applying the authentication code generation algorithm AAi to the new first nonce N1, the new second nonce N2, the information OLT_A_S, the further information OTD2_A_S, the device identifier OTD2-ID, the registration identifier Reg-ID2 and the previous encryption key EK, by using the new encryption key NEK as a key for the authentication code generation algorithm AAi.

Then, preferably, the OLT 100 compares the encryption-authentication code E-AC* received from the optical termination device OTD2 with the further encryption-authentication code E-AC calculated during step 607 (step 608).

If the encryption-authentication code E-AC* is equal (step 609) to the further encryption-authentication code E-AC, then the key updating procedure ends. Preferably, the OLT 100 and the optical terminal device OTD2 store the new encryption key NEK in their respective shadow_key_registers. As described in the ITU-T Recommendation G.984.3 (February 2004), paragraph 12.3, the OLT chooses a frame number indicating the first frame addressed to the optical termination device OTD2 that will be encrypted by using the new encryption key. the OLT 100 preferably transmits this frame number to the optical termination device OTD2 by using a Key_Switching_Time message. At the beginning of the frame identified by the frame number, the OLT copies the new generated encryption key NEK* stored in its shadow_key_register into its active_key_register, while also the optical device OTD2 copies the new generated encryption key NEK into its active_key_register. Both the OLT 100 and the optical termination device OTD2 then begin using the new generated encryption key NEK.

Otherwise, if the encryption-authentication code E-AC* is not equal to the further encryption-authentication code E-AC, the OLT 100 preferably interrupts the key updating procedure (step 609). In this case, preferably, the OLT 100 sends a deactivation command to the optical termination device OTD2 and removes from its local register the association between the serial number and the device identifier OTD2-ID of the optical termination device OTD2. On the other hand, upon reception of the deactivation command (step 610), the optical termination device OTD2 preferably switches off its transmitter, thus stopping generating uplink traffic.

According to the particularly advantageous embodiments herein described the first authentication message, the second authentication message, the counter-authentication message and the encryption-authentication message are implemented in the form of the above mentioned Request_Password, Password, Request_Key and Encryption_Key messages defined by the ITU-T Recommendation G.984.3 (February 2004), respectively. In this way, the above described mechanisms of mutual authentication and generation of the encryption key may be advantageously implemented without modifying the part of ITU-T Recommendation G.984.3 (February 2004) referring to such messages.

It is to be understood that the usage of the information exchanged between the OLT and the optical termination device OTDs can be adapted in order to include more and different cryptographic algorithms (e.g. new authentication code algorithms and new encryption key generation algorithms).

The invention claimed is:

1. A method for a passive optical network including an optical termination device and an optical line termination, wherein said method comprises:
 a) at said optical line termination:
  a1) detecting access of said optical termination device to said passive optical network;
  a2) establishing a connection with said optical termination device;
  a3) generating a first authentication message comprising a first random number associated with said optical termination device, said first authentication message being configured as a physical layer operations and maintenance message; and
  a4) transmitting said first authentication message through said established connection;
 b) at said optical termination device:
  b1) receiving said first authentication message through said established connection;
  b2) calculating a first authentication code by using said first random number and a secret code stored at said optical termination device; and
  b3) generating and transmitting through said established connection a second authentication message comprising said first authentication code, said second authentication message being configured as a physical layer operations and maintenance message;
 c) at said optical line termination:
  c1) receiving said second authentication message;
  c2) calculating a second authentication code by using said first random number and a secret code stored at said optical line termination; and
  c3) authenticating said optical termination device if said first authentication code matches said second authentication code.

2. The method according to claim 1, wherein said network includes a plurality of optical termination devices connected to the optical line termination and wherein said step a2) includes:
 assigning a time interval for upstream transmission to said optical termination device; and
 synchronizing the upstream transmission by the optical termination devices.

3. The method according to claim 1, wherein said step a3) comprises at said optical line termination:
 d1) setting first information indicative of at least one of an authentication code generation algorithm, an encryption key generation algorithm and an encryption key length supported by said optical line termination; and
 d2) transmitting said first information in said first authentication message.

4. The method according to claim 3, wherein said step b2) comprises at said optical termination device:
 e1) generating a second random number;
 e2) setting second information indicative of the at least one of the authentication code generation algorithm, the encryption key generation algorithm and the encryption key length supported by said optical termination device; and
 e3) calculating said first authentication code by using said second random number, said first information and said second information.

5. The method according to claim 4, wherein:
 said step b3) comprises, at said optical termination device:
 f1) transmitting said second random number and said second information in said second authentication message; and
 said step c2) comprises, at said optical line termination:
 g1) retrieving said second random number and said second information from said second authentication message; and
 g2) using said second random number, said first information and said second information for calculating said second authentication code.

6. The method according to claim 5, further comprising:
 h) at said optical line termination:
  h1) generating a third random number;
  h2) calculating a first counter-authentication code by using said third random number and said secret code stored at said optical line termination; and
  h3) generating and transmitting through said established connection a third authentication message comprising said third random number and said counter-authentication code, said third authentication message being configured as a physical layer operations and maintenance message;
 i) at said optical termination device:
  i1) receiving said third authentication message;
  i2) calculating a second counter-authentication code by using said third random number and said secret code stored at said optical termination device; and
  i3) counter-authenticating said optical line termination if said first counter-authentication code matches said second counter-authentication code.

7. The method according to claim 6, wherein said step h2) comprises:
 l1) calculating a first authentication key by using said first random number, said second random number and said secret code stored at said optical line termination; and
 l2) calculating said first counter-authentication code by using said third random number and said first authentication key.

8. The method according to claim 7, wherein said step i2) comprises:
- m1) calculating a second authentication key by using said first random number, said second random number and said secret code stored at said optical termination device; and
- m2) calculating said second counter-authentication code by using said third random number and said second authentication key.

9. The method according to claim 8, further comprising:
- n) at said optical termination device:
  - n1) generating a fourth random number;
  - n2) calculating a first encryption key by using said third random number, said fourth random number and said secret code stored at said optical termination device;
  - n3) calculating a first encryption-authentication code by using said third random number, said fourth random number and said encryption key;
  - n4) generating a first encryption key message comprising said fourth random number and said first encryption-authentication code, said first encryption key message being configured as a physical layer operations and maintenance message; and
  - n5) transmitting said first encryption key message through said established connection;
- k) at said optical line termination:
  - k1) receiving said first encryption key message;
  - k2) calculating a second encryption key by using said third random number, said fourth random number and said secret code stored at said optical termination device;
  - k3) generating a second encryption-authentication code by using said third random number, said fourth random number and said second encryption key;
  - k4) determining if said first encryption-authentication code matches said second encryption-authentication code thus determining if said first encryption key has the same value as said second encryption key; and in the affirmative; and
  - k5) using said encryption key for encrypting said established connection.

10. The method according to claim 9, wherein:
- said step n2) comprises calculating said first encryption key by using said first information and said second information; and
- said step n3) comprises calculating said first encryption-authentication code by using said first information, said second information and said second authentication key.

11. The method according to claim 10, wherein:
- said step k2) comprises calculating said second encryption key by using said first information and said second information; and
- said step k3) comprises calculating said second encryption-authentication code by using said first information, said second information and said authentication key.

12. The method according to claim 11, further comprising periodically repeating steps h to k, to refresh said first and second encryption keys using, at said optical line termination, said second encryption key, and using, at said optical termination device, said first encryption key.

13. A method performed at an optical line termination for a passive optical network comprising:
- detecting access of an optical termination device to said passive optical network;
- establishing a connection with said optical termination device by assigning a time interval for upstream transmission to said optical termination device;
- generating a first authentication message comprising a first random number associated with said optical termination device, said first authentication message being configured as a physical layer operations and maintenance message;
- transmitting said first authentication message through said established connection;
- receiving a second authentication message through said established connection, said second authentication message comprising a first authentication code, said second authentication message being configured as a physical layer operations and maintenance message;
- calculating a second authentication code by using said first random number and a secret code stored at said optical line termination; and
- authenticating said optical termination device if said first authentication code matches said second authentication code.

14. A method performed by an optical termination device configured to access a passive optical network including an optical line termination, said method comprising:
- having assigned a time interval for upstream transmission with said optical line termination;
- receiving a first authentication message through an established connection, said first authentication message comprising a first random number associated to said optical termination device, said first authentication message being configured as a physical layer operations and maintenance message;
- calculating an authentication code by using said first random number and a secret code stored at said optical termination device; and
- generating and transmitting through said established connection a second authentication message comprising said first authentication code, said second authentication message being configured as a physical layer operations and maintenance message.

15. A non-transitory computer readable medium having computer program code stored thereon that, when executed by a computing device at an optical line termination for a passive optical network, performs the steps comprising:
- detecting access of an optical termination device to said passive optical network;
- establishing a connection with said optical termination device by assigning a time interval for upstream transmission to said optical termination device;
- generating a first authentication message comprising a first random number associated with said optical termination device, said first authentication message being configured as a physical layer operations and maintenance message;
- transmitting said first authentication message through said established connection;
- receiving a second authentication message through said established connection, said second authentication message comprising a first authentication code, said second authentication message being configured as a physical layer operations and maintenance message;
- calculating a second authentication code by using said first random number and a secret code stored at said optical line termination; and
- authenticating said optical termination device if said first authentication code matches said second authentication code.

16. A non-transitory computer program readable medium having computer program code stored thereon that, when said program is executed by a computing device at an optical termination device configured to access a passive optical network including an optical line termination, performs the steps comprising:

- having assigned a time interval for upstream transmission with said optical line termination;
- receiving a first authentication message through an established connection, said first authentication message comprising a first random number associated with said optical termination device, said first authentication message being configured as a physical layer operations and maintenance message;
- calculating an authentication code by using said first random number and a secret code stored at said optical termination device; and
- generating and transmitting through said established connection a second authentication message comprising said first authentication code, said second authentication message being configured as a physical layer operations and maintenance message.

* * * * *